(12) United States Patent
Soma et al.

(10) Patent No.: US 12,307,308 B2
(45) Date of Patent: May 20, 2025

(54) PRINTING APPARATUS, METHOD OF CONTROLLING PRINTING APPARATUS, AND STORAGE MEDIUM

(71) Applicant: CANON KABUSHIKI KAISHA, Tokyo (JP)

(72) Inventors: Kanako Soma, Kanagawa (JP); Yoshiaki Murayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 205 days.

(21) Appl. No.: 18/311,814

(22) Filed: May 3, 2023

(65) Prior Publication Data
US 2023/0385584 A1  Nov. 30, 2023

(30) Foreign Application Priority Data
May 31, 2022  (JP) ................................ 2022-088824

(51) Int. Cl.
*G06K 15/02* (2006.01)
*B41J 2/045* (2006.01)
*G06K 15/10* (2006.01)

(52) U.S. Cl.
CPC ...... *G06K 15/1871* (2013.01); *B41J 2/04508* (2013.01); *B41J 2/04586* (2013.01); *G06K 15/102* (2013.01); *G06K 15/1843* (2013.01)

(58) Field of Classification Search
CPC . B41J 2/04508; B41J 2/04586; G06K 15/102; G06K 15/1843; G06K 15/1871
See application file for complete search history.

(56) References Cited

U.S. PATENT DOCUMENTS

| | | | |
|---|---|---|---|
| 2003/0147091 A1* | 8/2003 | Otokita | G06K 15/102 358/1.14 |
| 2019/0263139 A1* | 8/2019 | Tanase | G06K 15/107 |

FOREIGN PATENT DOCUMENTS

JP  2019-209479  12/2019

* cited by examiner

*Primary Examiner* — Thinh H Nguyen
(74) *Attorney, Agent, or Firm* — Venable LLP

(57) ABSTRACT

An object of the present disclosure is to avoid degradation of image quality. An embodiment of the present invention is a printing apparatus including: a print head; a detection unit configured to detect an edge region and a non-edge region of an object in image data; and a tone correction unit configured to adjust an application amount of a printing agent for a unit region based on whether the unit region is the edge region or the non-edge region, in which the printing apparatus is capable of performing printing in a first printing mode or a second printing mode, in the first printing mode, an input resolution of the image data is lower than a printing resolution of the print head, in the second printing mode, the input resolution of the image data is higher than or equal to the printing resolution of the print head.

9 Claims, 26 Drawing Sheets

| PRINTING MODE | A | B |
|---|---|---|
| INPUT RESOLUTION | 600dpi | 1200dpi |
| DRIVING RESOLUTION | 600dpi | 1200dpi |
| QUANTIZATION RESOLUTION | 600dpi | 1200dpi |
| EDGE PROCESS | ON | ON |

FIG.9

| 90 | 142 | 236 | 10 | 24 | 208 | 78 | 243 | 113 | 46 | 220 | 134 | 84 | 53 | 149 | 24 | 31 | 233 |
|---|---|---|---|---|---|---|---|---|---|---|---|---|---|---|---|---|---|
| 35 | 206 | 62 | 171 | 247 | 94 | 128 | 185 | 11 | 173 | 163 | 74 | 247 | 203 | 121 | 125 | 233 | 39 |
| 70 | 163 | 228 | 193 | 145 | 3 | 60 | 137 | 211 | 48 | 122 | 218 | 44 | 160 | 126 | 0 | 120 | 34 |
| 242 | 111 | 24 | 98 | 173 | 199 | 240 | 107 | 24 | 244 | 174 | 69 | 185 | 56 | 212 | 40 | 146 | 152 |
| 193 | 47 | 138 | 124 | 145 | 73 | 69 | 188 | 149 | 141 | 121 | 23 | 138 | 200 | 78 | 170 | 82 | 203 |
| 206 | 150 | 12 | 94 | 9 | 111 | 226 | 24 | 97 | 199 | 160 | 48 | 32 | 179 | 128 | 130 | 12 | 95 |
| 1 | 247 | 38 | 109 | 144 | 124 | 6 | 84 | 151 | 79 | 243 | 51 | 215 | 36 | 13 | 178 | 131 | 90 |
| 122 | 172 | 24 | 226 | 73 | 57 | 114 | 188 | 232 | 22 | 110 | 168 | 112 | 157 | 242 | 97 | 720 | 207 |
| 218 | 26 | 114 | 185 | 134 | 193 | 164 | 33 | 30 | 144 | 200 | 2 | 75 | 138 | 93 | 194 | 106 | 220 |
| 193 | 47 | 138 | 124 | 44 | 150 | 69 | 188 | 149 | 141 | 121 | 23 | 200 | 228 | 78 | 170 | 82 | 203 |
| 166 | 229 | 31 | 149 | 240 | 165 | 124 | 75 | 249 | 10 | 118 | 236 | 69 | 95 | 242 | 50 | 188 | 120 |
| 92 | 93 | 56 | 30 | 126 | 57 | 155 | 192 | 87 | 188 | 53 | 164 | 215 | 12 | 153 | 185 | 139 | 50 |

FIG.13

PRINTING APPARATUS, METHOD OF CONTROLLING PRINTING APPARATUS, AND STORAGE MEDIUM

BACKGROUND

Field

The present disclosure relates to a technique for an inkjet printing apparatus.

Description of the Related Art

Heretofore, one concern with printing apparatuses has been that images of lines, characters, or the like bleed and blur due to penetration of the printing agent such as an ink into the print medium, which lowers the quality of the images. A countermeasure against this concern has been known in which an image is subjected to a filtering process to detect the image's edge portion, and the pixels of the edge portion (hereinafter "edge pixels") and the pixels of the non-edge portion (hereinafter "non-edge pixels") are corrected. Japanese Patent Laid-Open No. 2019-209479 proposes a method in which an image's edge portion is detected, and the application amount of the printing agent for the portions determined as edge pixels is made smaller than the non-edge pixels.

SUMMARY

Depending on a printing apparatus' printing mode, the area of a single pixel in an input image on a print medium may vary. Assume that the correction of the application amount of the printing agent for edge pixels disclosed in Patent Document 1 is performed in a uniform manner on this image in which the area of a single pixel on a print medium varies. In this case, the area of a single pixel on a print medium changes the arrangement of application of the printing agent on the print medium. As a result, an image of a line, a character, or the like appear discontinuous particularly in an input image in which the area of a single pixel on the print medium is small.

Thus, an object of the present disclosure is to avoid degradation of image quality in a case of performing an edge process on an input image in which the area of a single pixel on a print medium varies by the printing mode, and then printing the resulting image.

An embodiment of the present invention is a printing apparatus including: a print head in which a plurality of nozzles from which to eject a printing agent are arrayed along a first direction; a detection unit configured to detect an edge region and a non-edge region of an object in image data; and a tone correction unit configured to adjust an application amount of the printing agent for a unit region based on whether the unit region is the edge region or the non-edge region, in which the printing apparatus is capable of performing printing in a first printing mode or a second printing mode, in the first printing mode, an input resolution of the image data is lower than a printing resolution of the print head, in the second printing mode, the input resolution of the image data is higher than or equal to the printing resolution of the print head, and the tone correction unit makes the application amount for the edge region in the second printing mode smaller than the application amount for the non-edge region and larger than the application amount for the edge region in the first printing mode.

Further features of the present invention will become apparent from the following description of exemplary embodiments with reference to the attached drawings.

BRIEF DESCRIPTION OF THE DRAWINGS

FIG. 9 is a table for explaining printing modes;

FIG. 13 is a diagram illustrating a dither matrix;

DESCRIPTION OF THE EMBODIMENTS

First Embodiment

Embodiments of the present disclosure will be described below with reference to the drawings. The description to be given below assumes image processing in an inkjet printer's main body. However, this is a mere example of one embodiment, and the concept of the present disclosure is not limited to the following configuration.

<Inkjet Printing Apparatus>

Figure 1:
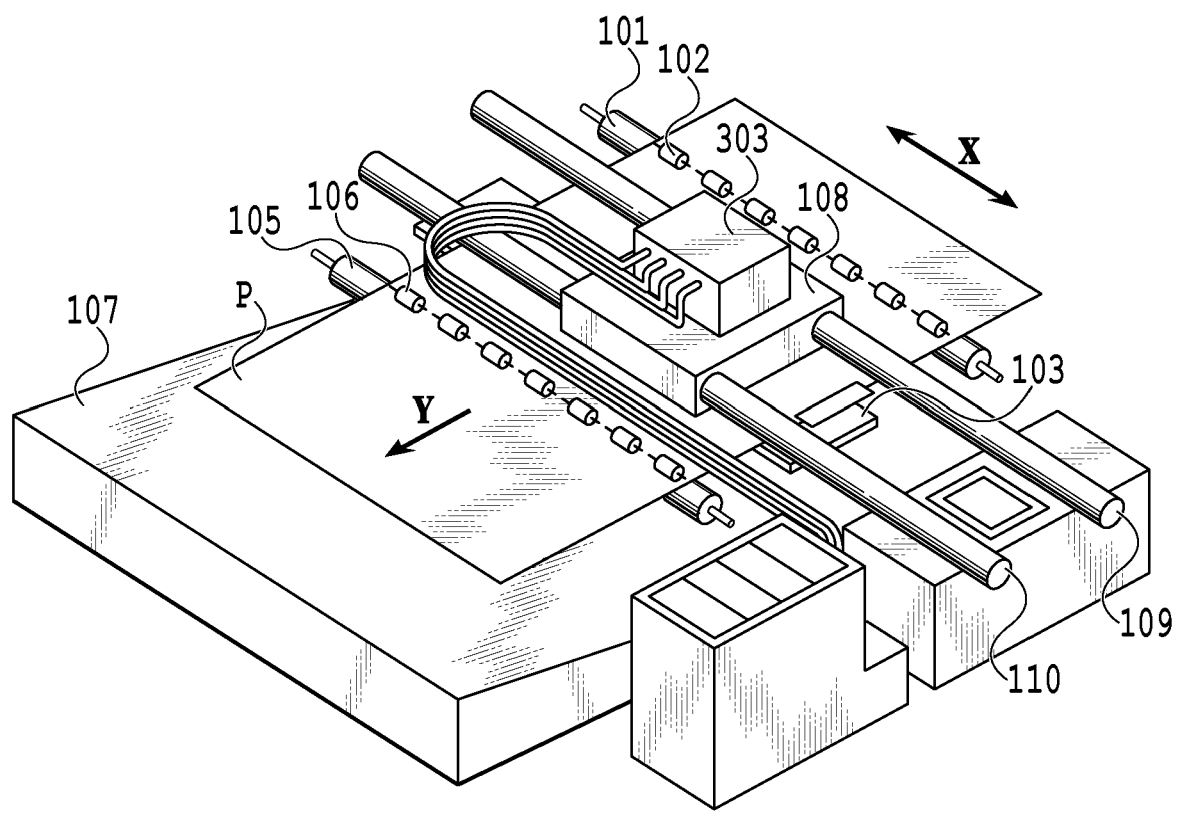
FIG. 1 is a perspective view schematically illustrating an inkjet printer.

FIG. 1 is a view explaining an inkjet printing apparatus (hereinafter simply "printing apparatus") according to a first embodiment. The printing apparatus in the present embodiment is an inkjet printer of a so-called serial printing type, and scans a print head 303 multiple times over a print medium P to complete printing of an image of each unit region.

In the printing apparatus, a print medium P fed to a printing unit is conveyed in the direction of the arrow Y in FIG. 1 (sub scanning direction) by a nipping part including a conveyance roller 101 disposed on a conveyance path and pinch rollers 102 that follow this conveyance roller 101 with rotation of the conveyance roller 101. A platen 103 is provided at a position opposed to the ejection port surface (nozzle formation surface) of the print head 303 of the inkjet printing type in which ejection ports (so-called "nozzles") are formed. By supporting the back surface of the print medium P from below, the platen 103 maintains a constant distance between the front surface of the print medium P and the ejection port surface of the print head 303. After an image is printed, the print medium P is nipped between a discharge roller 105 and spur rollers 106 that follow this discharge roller 105 and conveyed in the Y direction with rotation of the discharge roller 105 and is discharged onto a discharge tray 107.

The print head 303 is detachably mounted on a carriage 108 in such a posture that the nozzle formation surface faces the platen 103 or the print medium P. The carriage 108 moves reciprocally in the X direction along two guide rails 109 and 110 with a driving force from a carriage motor. During that movement, the print head 303 executes an ejection operation of ejecting ink droplets from nozzles according to print signals to apply inks onto the print medium.

Figure 2:
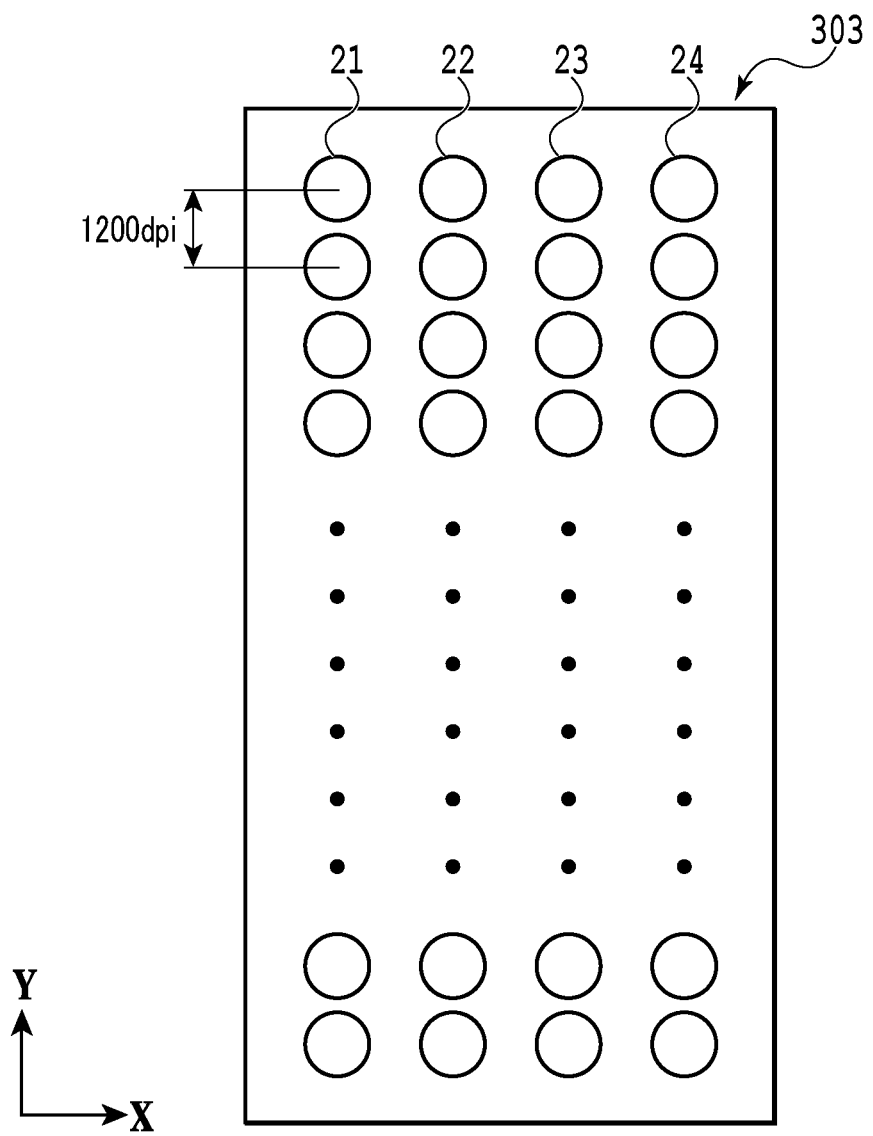
FIG. 2 is a schematic view of a print head as observed from its nozzle formation surface.

FIG. 2 is a schematic view of the print head 303 as observed from the nozzle formation surface side. A cyan nozzle array 21, a magenta nozzle array 22, a yellow nozzle array 23, and a black nozzle array 24 are arranged side by side in the X direction. In each of these nozzle arrays, nozzles for ejecting an ink are disposed at equal intervals along the Y direction. The interval between nozzles in the same nozzle array in the Y direction will be referred to as "nozzle pitch". In the present embodiment, the nozzle pitch is 1200 dpi.

Also, a printing element (not illustrated) is provided inside each nozzle. The printing element generates a thermal energy by being driven with an electric energy. This thermal energy generates a bubble in the ink, which in turn causes the ink to be ejected from the nozzle in the form of a droplet. Incidentally, in the following description, an array of nozzles that eject the same amount of an ink of the same color will be referred to as "nozzle array" for simplicity.

The X direction, in which the carriage 108 moves, is a direction crossing the Y direction, in which print media are conveyed, and is called "main scanning direction". On the other hand, the Y direction, in which print media are conveyed, is called "sub scanning direction", "conveyance direction", etc. An image is formed in a stepwise manner on the print medium P by alternately repeating movement of the carriage 108 and the print head 303 with printing, or "main scan", and conveyance of the print medium (sub scan).

Figure 3:
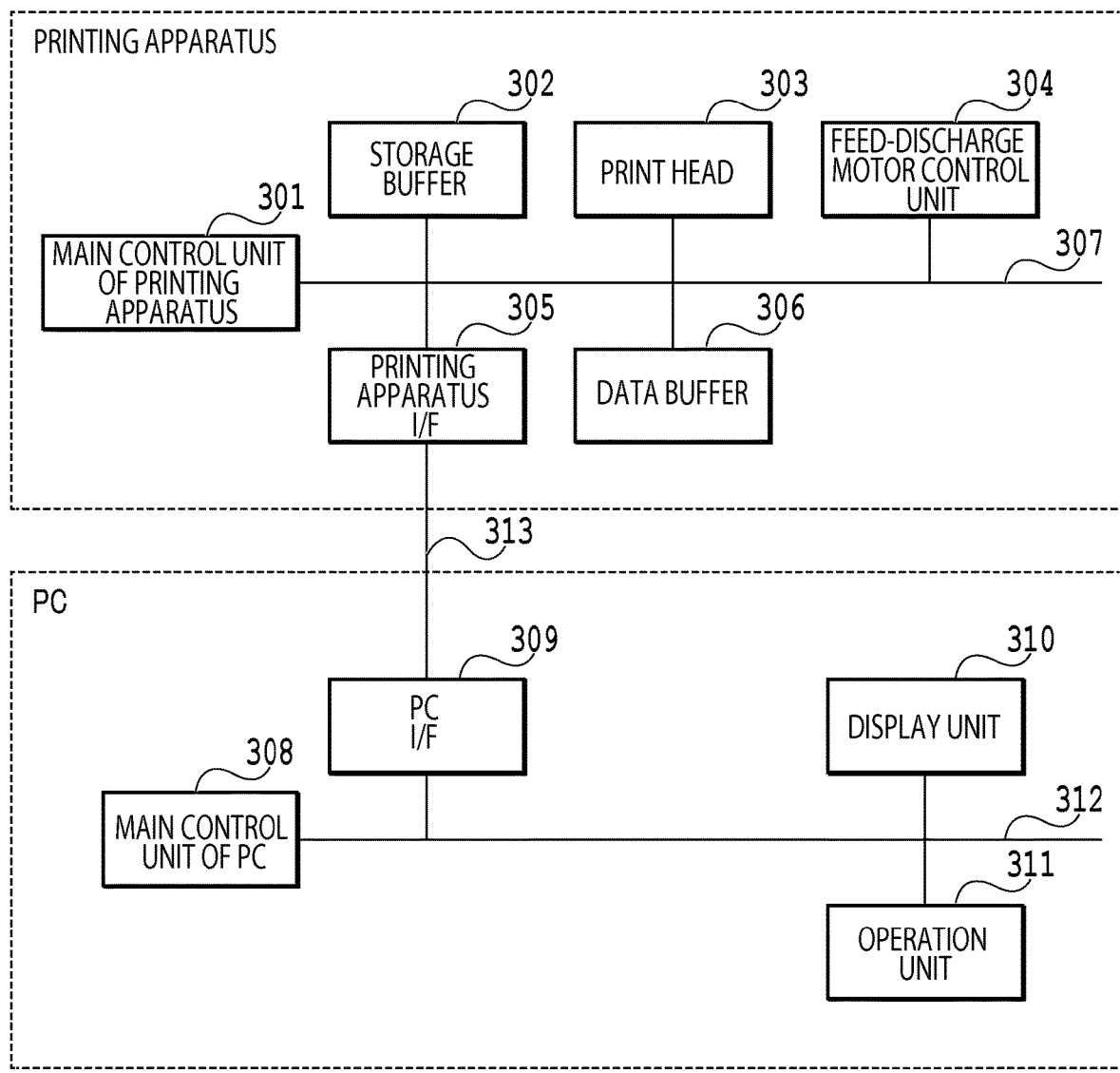
FIG. 3 is a block diagram of a printing system.

FIG. 3 is a block diagram illustrating a configuration related to control in a printing system including the printing apparatus in the present embodiment. A main control unit 301 of the printing apparatus controls the whole printing apparatus and includes a central processing unit (CPU), a read-only memory (ROM), a random access memory (RAM), and the like. A storage buffer 302 stores image data representing an image to be printed by the print head 303 in the form of raster data. The print head 303 is a print head of the inkjet printing type having multiple nozzles capable of ejecting ink droplets, and ejects an ink from each nozzle according to the image data stored in the storage buffer 302. A feed-discharge motor control unit 304 controls the conveyance, feed, and discharge of print media. A printing apparatus interface (hereinafter "printing apparatus I/F") 305 is connected to a personal computer (PC) by an I/F signal line 313, and sends and receives data signals. A data buffer 306 temporarily stores a print job and the like received from the PC. The print job contains image data and print setting information. A system bus 307 is a bus connecting constituent elements of the printing apparatus.

A main control unit 308 of the PC is mainly responsible for creation of images and control of image data in the PC, and includes a CPU, a ROM, a RAM, and the like. A PC interface (hereinafter "PC I/F") 309 sends and receives data signals to and from the printing apparatus. A display unit 310 displays various pieces of information addressed to the user. For example, a liquid crystal display (LCD) or the like can be used as the display unit 310. An operation unit 311 is an operation unit that receives operations and instructions from the user. For example, a keyboard and a mouse can be used. A system bus 312 is a bus connecting the main control unit 308 of the PC to constituent elements of the PC.

<General Description of Printing System>

Figure 4:
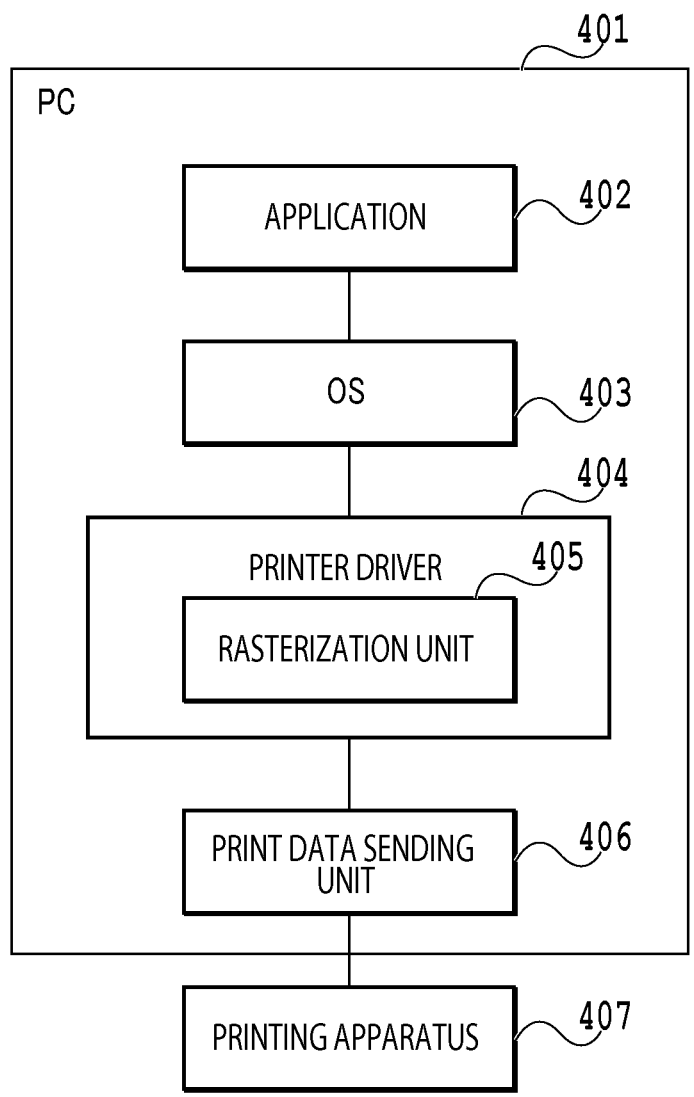
FIG. 4 is a block diagram of the printing system.

FIG. 4 is a block diagram illustrating a functional configuration on a PC 401 side as a general configuration of the printing system in the present embodiment. As illustrated in FIG. 4, the printing system has the PC 401 that serves as a host, and a printing apparatus 407 that prints an image on a print medium based on print data sent from the PC 401. The PC 401 has an application 402, an operating system (OS) 403, a printer driver 404, and a print data sending unit 406. The following description will be given with print data for printing an image of a barcode as an example of the print data to be sent to the printing apparatus 407. Note that an image of a barcode will be used as an example of an image with edges, but the application target of the present disclosure is not limited to images of barcodes. The present disclosure is applicable to image data for drawing any object having an edge.

The application 402 is an application capable of inserting barcode data into an image. In response to an instruction from the printer driver 404, data obtained by a function necessary for image processing that is provided by the OS 403 and data obtained from the application 402 are combined and converted into print data.

The printer driver 404 generates print data printable by the printing apparatus by performing predetermined image processing on image data. Specifically, the printer driver 404 converts image data into print data of a format printable by the printing apparatus by, for example, causing a rasterization unit 405 to rasterize (bitmap) the print data into such an image that the width of a single pixel adjusted to the print head corresponds to a distance on a print medium. As will be described later in detail, the printer driver 404 executes the processes illustrated in FIGS. 5, 19, and 23. The print data generated by the printer driver 404 is sent to the print data sending unit 406 and then sent to the printing apparatus 407.

Next, a process by which a preset character string is sent as barcode data to the printing apparatus 407 in the printing system in the present embodiment will be described. Barcode data is image data containing a so-called barcode including a combination of bars and spaces. A barcode image is generated by converting a preset character string into a format formed of bars and spaces based on a barcode font.

In response to inputting a character string into the application 402, the printer driver 404 is invoked through the OS 403. Then, barcode font information held by the printer driver 404 is requested, and the user sets a designated barcode font.

The barcode font information contains information such as a barcode font name selected from among pre-registered barcode types, and the height and width of the barcode font. Examples include the Japanese Article Numbering (JAN) code, CODE 39, CODE 128, and so on. Then, the application 402 sends those setting values and the image data together to the printer driver 404 through the OS 403.

Thereafter, using the designated barcode font, the rasterization unit 405 rasterizes the image data into barcode data formed of a combination of one-dimensional bars and spaces. The rasterized data is converted into print data in a form receivable by the printing apparatus 407, and sent to the printing apparatus 407 through the print data sending unit 406.

While a configuration in which an application invokes a printer driver's barcode font through an OS has been described, the present embodiment is not limited to this configuration.

<Flow of Entire Image Processing>

Figure 5:
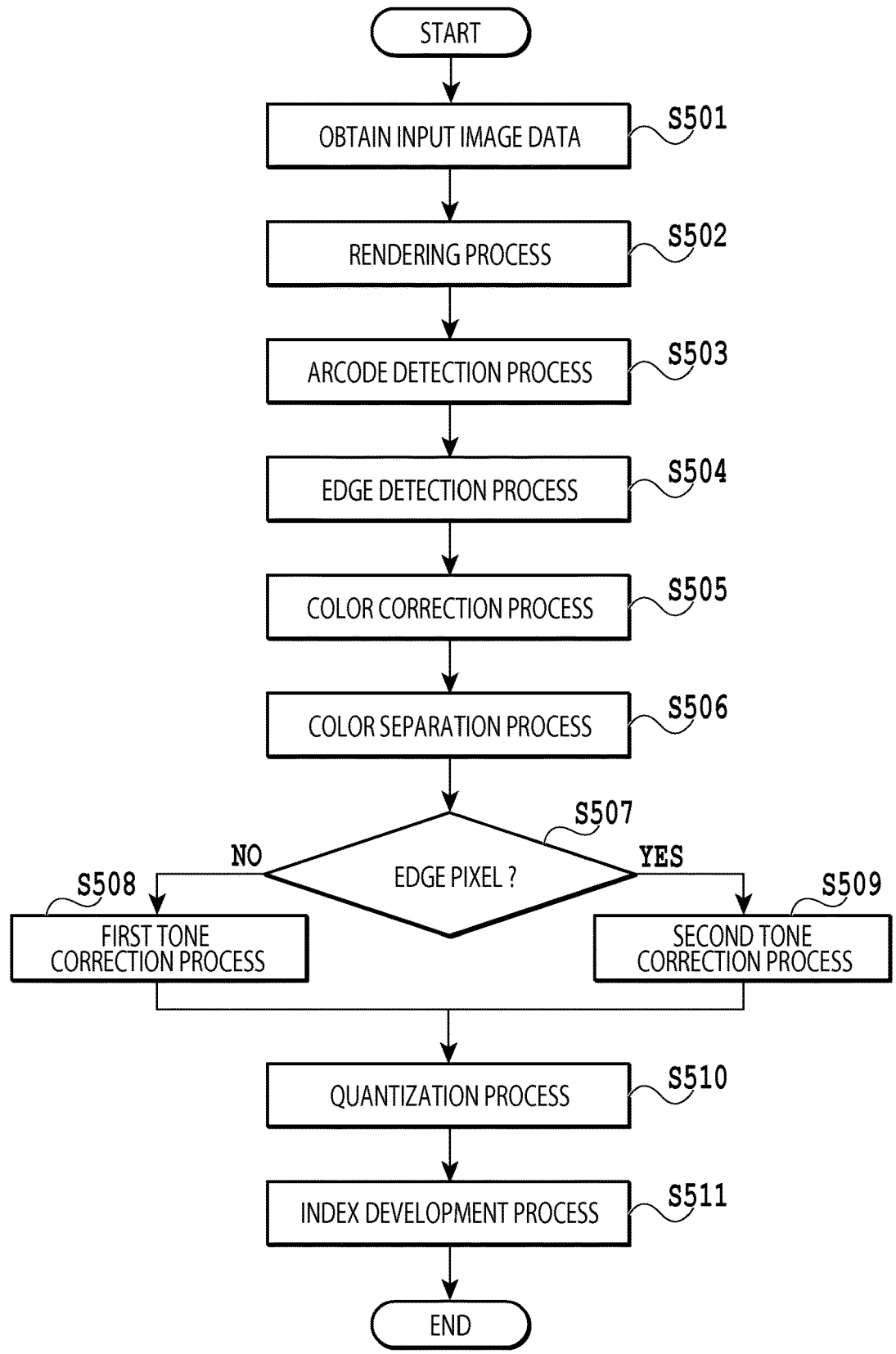
FIG. 5 is a flowchart of image processing.

FIG. 5 is a flowchart for explaining processing of image data. The processing illustrated in FIG. 5 may be performed by the PC 401 serving as a host, performed by the printing apparatus 407, or shared and executed by the PC 401 and the printing apparatus 407. The following description will be given on the assumption that the PC 401 executes the processing.

In step S501, the main control unit 308 obtains input image data. The image data obtained in this step may be vector data or bitmap data. Also, the resolution of the image data obtained in this step (hereinafter "input resolution") is not limited. In the following, "step S_____" will be abbreviated as "S_____". The following description will be given on the assumption that vector data is obtained in this step.

In S502, the main control unit 308 executes a rendering process on the image data obtained in S501. In this step, the vector data is rasterized. Here, the rendering is performed such that the distance across a single pixel on a print medium and the output pitch in the main scanning direction (X direction) can be synchronized according to the printing mode. For this reason, the rendering process in this step may be skipped in a case where the distance across a single pixel in the image input by the user on a print medium can be synchronized with the output pitch in the main scanning direction (X direction). This step may also include mapping, imposition, and so on based on the size of the print medium on which to print the image.

Incidentally, of pixels arranged in a matrix, data of a pixel group being a single array of pixels lying side by side in the main scanning direction will be referred to as "raster data". Moreover, a plurality of those arrays lying next to each other will be referred to as "band data". In the case where the printing apparatus 407 performs the image processing, a configuration that sequentially processes pieces of band data is often employed since the processing needs to be efficiently performed using a ROM and a RAM with small capacities.

In S503, functioning as a barcode detection unit, the main control unit 308 detects a barcode. In this step, position information indicating the position of the detected barcode is obtained. Barcode data may be formed by rasterizing a barcode font or formed as bitmap data or vector data from the beginning. Thus, the main control unit 308 may obtain the position information of the barcode at the time of the rendering in S502 or detect the barcode by using edge information or the like after the bitmapping. Also, a method in which the user makes designations on a panel or the host side or the like may be employed.

In S504, functioning as an edge detection unit, the main control unit 308 obtains edge information of objects (in this example, the bars of the barcode). Here, information on pixels corresponding to the edge regions of the bars and pixels corresponding to the non-edge regions of the bars, which are regions inward of the edges, are obtained as the edge information. Thereafter, the later-described control for the edge regions of the barcode is executed using the position information of the barcode obtained in S503 and the edge information obtained in S504. The edge detection process in this step can be performed using known means such as a Sobel filter or a Laplacian filter.

Figure 6:
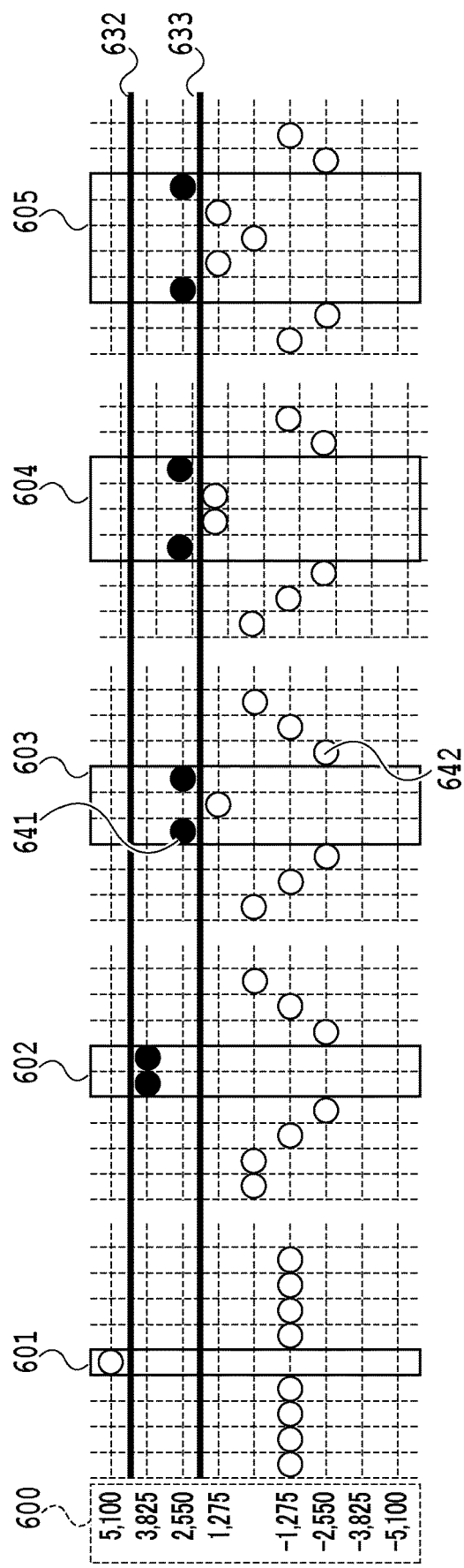
FIGS. 6A to 6D are diagrams for explaining edge region detection by a filtering process.

FIGS. 6A to 6D are diagrams for explaining a process of detecting an edge region by a filtering process. FIG. 6A illustrates an image of a vertical ruling line having the width of a single pixel in the horizontal direction as an example of an image to be drawn based on input image data. The pixel value of each pixel is a 256-tone luminance value, with "0" representing black and "255" representing white. FIG. 6B illustrates an edge detection filter. In FIG. 6B, the pixel value of each pixel represents a coefficient by which to multiple a luminance value. FIG. 6C illustrates the result of a calculation using the edge detection filter (the result of a calculation for the center pixel in FIG. 6A). FIG. 6D is calculation results with a filter plotted with a vertical axis 600. The horizontal axis corresponds to the pixel position. FIG. 6D illustrates calculation results for a vertical ruling line 601 having the width of a single pixel, a vertical ruling line 602 having the width of two pixels, a vertical ruling line 603 having the width of three pixels, a vertical ruling line 604 having the width of four pixels, and a vertical ruling line 605 having the width of five pixels with the filter in FIG. 6B. The calculation result with the filter differ by the width of the ruling line. For example, the calculated value in the calculation result for the line having the width of a single pixel is 5100 (=255×20).

As illustrated in FIG. 6D, the calculation result with the filter is a value(s) corresponding to the line width. Threshold values 632 and 633 are set, and a pixel whose calculation result is within this range is detected as an edge region. In this way, a line having the width of a single pixel is prevented from being detected as an edge region. Each black circle 641 represents a pixel determined as an edge region. Each white circle 642 represents a pixel determined as a non-edge region.

The above edge detection process may be performed on the entire region of the input image data or performed only on the detected barcode region. While the description to be given below assumes processing on the edge regions included in a barcode, this is a mere example of the present embodiment. The present embodiment can achieve a similar effect also in a case where it is applied to the edge region of a line or a character, instead of edge regions included in a barcode.

Figure 7:
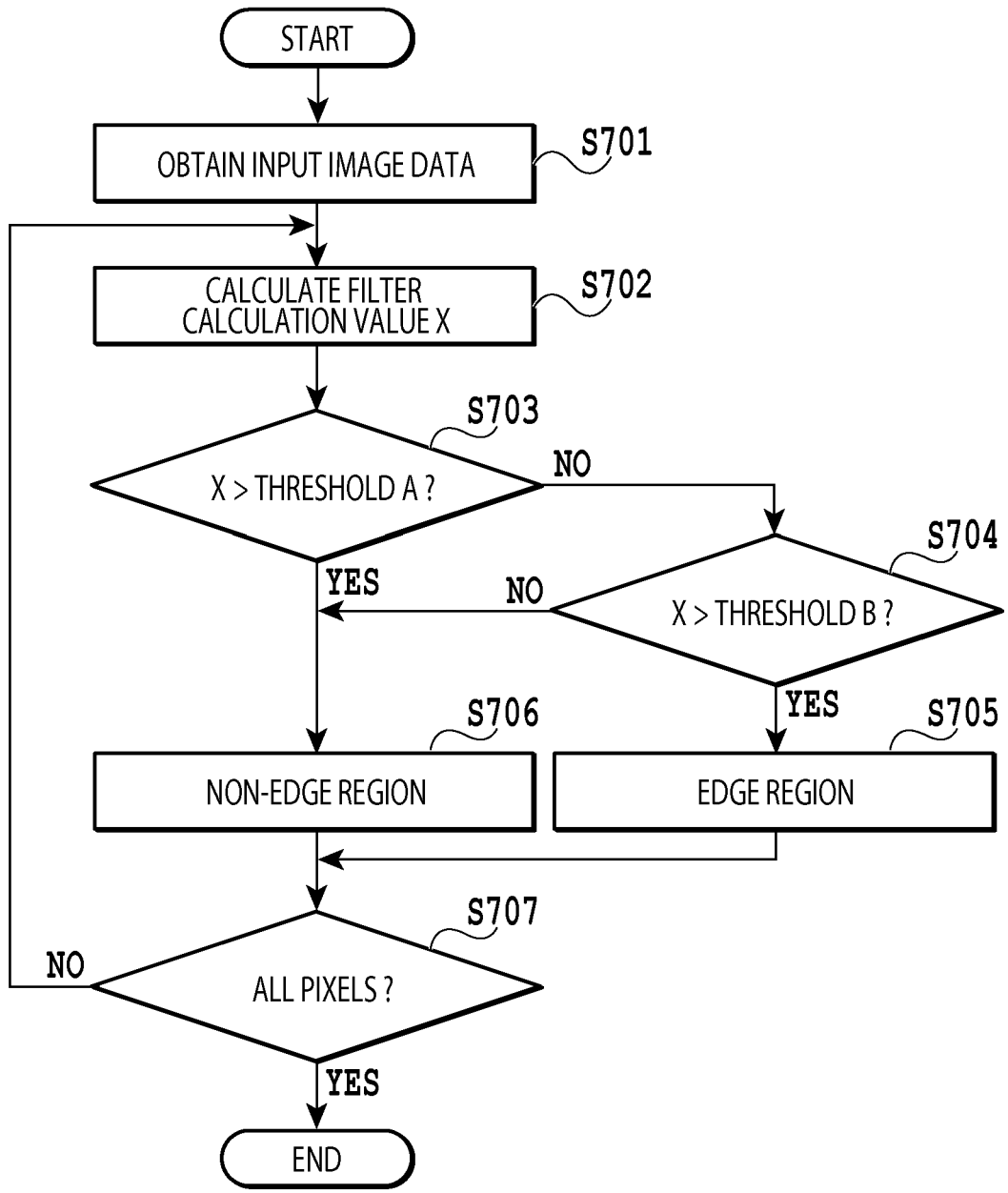
FIG. 7 is a detailed flowchart of an edge detection process.

FIG. 7 is a flowchart for explaining the edge detection process in S504 in detail. The edge detection process is repeated for all pixels rendered in S502. However, the following description is given such that the processing for a single pixel can be understood.

In S701, the input image data is obtained.

In S702, a filter calculation is performed to calculate a calculated value X of the processing object pixel. The filter calculation process in S702 includes the three steps below.

(First Step) As illustrated in FIG. 6A, the pixel values of the 5×5 pixel region centered at the processing object pixel are obtained.

(Second Step) The pixel values of the pixels are multiplied by the respective 5×5 filter coefficients illustrated in FIG. 6B.

(Third Step) All of the values of the pixels in FIG. 6C, which represent the 5×5 multiplication results, are summed up to calculate the calculated value X.

In S703, whether the calculated value X is above a threshold value A is determined. If the result of the determination in this step is positive, the processing proceeds to S706. If, on the other hand, the result of the determination is negative, the processing proceeds to S704. The threshold value A used in S703 is a value corresponding to the threshold value 632 in FIG. 6D mentioned earlier.

In S704, whether the calculated value X is above a threshold value B is determined. If the result of the determination in this step is positive, the processing proceeds to S705. If, on the other hand, the result of the determination is negative, the processing proceeds to S706. The threshold value B used in S704 is a value corresponding to the threshold value 633 in FIG. 6D mentioned earlier.

In S705, the processing object pixel is determined to be included in an edge region, and is given 1-bit edge information indicating that the pixel is an edge pixel.

In S706, the processing object pixel is determined to be included in a non-edge region, and is given 1-bit edge information indicating that the pixel is not an edge pixel.

In S707, it is determined whether the processes in S702 to S706 have been completed for all pixels in the input image data obtained in S701. If the result of the determination in this step is positive, the edge detection process is terminated, and the processing proceeds to S505 in FIG. 5. If the result of the determination in this step is negative, the processing returns to S702.

The edge detection process in S504 described above can be used as a common process for input images differing in the area of a single pixel on a print medium (i.e., input images with different input resolutions). Providing a common edge detection process for each printing mode reduces the load of the calculation process, which keeps the throughput from decreasing.

In S505 and S506 after S504, image processing for conversion into image data of a format printable by the printing apparatus 407 is performed. Specifically, the image data generated in S504 is converted into image data that is based on the color gamut of the printing apparatus 407.

In the present embodiment, the input image data is data indicating color coordinates (R, G, B) in a color space such as sRGB, which represents expression colors for monitors. In a color correction process in S505, the input image data containing 8-bit data for each of R, G, and B is converted into image data in the color gamut of the printer (R', G', B') by a known method, such as a matrix calculation process or a process using a three-dimensional look-up table (3D-LUT).

In S506, the main control unit 308 executes a color separation process. In the color separation process in this step, the 8-bit R'G'B' image data is converted into image data formed of pieces of color signal data each corresponding to an ink color used in the printing apparatus 407. The printing apparatus 407 in the present embodiment uses black (K), cyan (C), magenta (M), and yellow (Y) inks to print images. Thus, the image data of the RGB signals is converted into image data formed of 8-bit K, C, M, and Y color signals. This color conversion is performed using both a 3D-LUT and interpolation calculation. Like the above, a method such as a matrix calculation process may be used as another color conversion method. Also, the number of ink colors is not limited to four colors of K, C, M, and Y. The configuration may be such that other kinds of inks are additionally included, such as light cyan (Lc) and light magenta (Lm) inks with lower densities and a gray (Gy) ink as well as a clear ink and an ink of a particular color.

Figure 8:
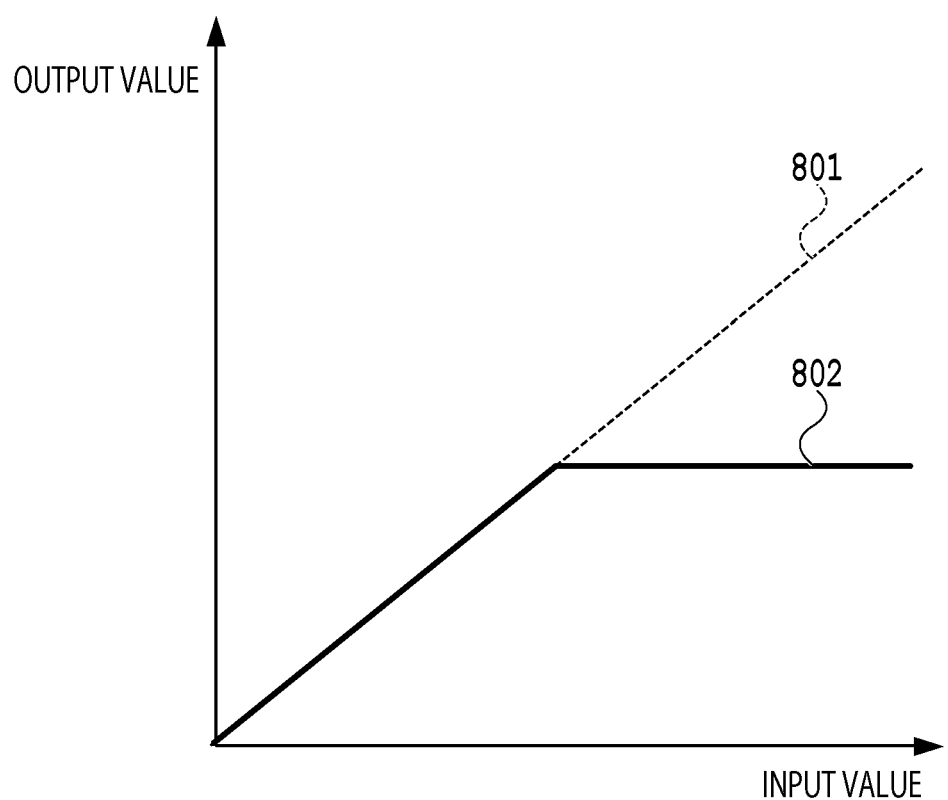
FIG. 8 is a schematic diagram of one-dimensional look-up tables.

Next, in S507 and S508 or S509, a tone correction process for adjusting the application amount of each printing agent is performed as a process for adjusting the number of dots to be printed on the print medium by correcting the 8-bit KCMY image data. A one-dimensional look-up table (1D-LUT) can be used as means for converting the input data into output data in this tone correction process. FIG. 8 illustrates a schematic diagram of 1D-LUTs. The horizontal axis represents an input tone value for each of C, M, Y, and K while the vertical axis represents an output tone value correlated to the number of dots to be applied onto a print medium. In the present embodiment, different tables can be included for edge pixels and non-edge pixels as the 1D-LUTs for the tone correction processes. Every pixel in the input image has been given edge information with a 1-bit expression indicating whether the pixel is an edge pixel or a non-edge pixel in S504. In S507, for every pixel, the main control unit 308 determines whether the target pixel is an edge pixel or a non-edge pixel. If the target pixel is a non-edge pixel, then in S508, the main control unit 308 refers to a look-up table 801 for a first tone correction process, and converts the input tone value into an output tone value. If, on the other hand, the target pixel is an edge pixel, then in S509, the main control unit 308 refers to a look-up table 802 for a second tone correction process, and converts the input tone value into an output tone value. The output tone value is a value correlated to the number of dots to be applied near the pixel of interest. Here, the output tone value associated with the input tone value in the look-up table 802 for edge pixels is set to be smaller than that in the look-up table 801 for non-edge pixels.

Next, in S510, the main control unit 308 executes a quantization process on the 8-bit, 256-level image data of each ink color. In a case where the input resolution and the printing resolution are equal, the quantization process generates binary data with a 1-bit expression for each pixel with "1" indicating printing and "0" indicating no printing. In a case where the input resolution is lower than the printing resolution, the output of the quantization process will be multi-valued data with two or more bits. In the present embodiment, in a mode in which the input resolution is 1200 dpi, which is equal to the printing resolution, the output of the quantization process will be binary data with "1" indicating printing or "0" indicating no printing. On the other hand, in a mode in which the input resolution is lower than the printing resolution (600 dpi), the output of the quantization process will be ternary or higher quantized data corresponding to the number of ink droplets per pixel at the input resolution. Note that "printing resolution" is a printing resolution determined by the printing apparatus in advance, and is determined by the nozzle interval (nozzle pitch) and the main scanning speed. It is preferable to use error diffusion or dithering as the method of the quantization process.

In the case where the printing resolution is higher than the input resolution, then in S511, the main control unit 308 executes an index development process based on the ternary or higher quantized data generated in S510. The index development process converts the quantized data with the input resolution into binary data with the printing resolution. The process in S511 is skipped in the case where the input resolution is equal to the printing resolution.

By S510 or S511, binary data is generated with "1" indicating printing and "0" indicating no printing for each pixel at the printing resolution. Then, according to this binary data, the printing element in the corresponding nozzle is driven with corresponding timing to eject an ink droplet. As a result, an image is printed on a print medium.

<Description of Printing Control>

In the present embodiment, the tone correction process performed on an edge portion varies by the input resolution. Here, a low resolution mode in which the input resolution is 600 dpi×600 dpi and a high resolution mode in which the input resolution is 1200 dpi×1200 dpi will be described as a specific example.

The two printing modes illustrated in FIG. 9 will be exemplarily described below using the print head illustrated in FIG. 2, whose nozzle pitch is 1200 dpi. As illustrated in FIG. 9, the two printing modes are a printing mode A in which the input resolution is 600 dpi and a printing mode B in which the input resolution is 1200 dpi. In the present embodiment, two pixels from an edge are detected as an edge region with a 5×5 filter, but the present embodiment is not limited to such a method.

First of all, to describe a problem in the present embodiment, a description will be given of dot arrangements on a print medium in a case where the number of dots per unit region of 600 dpi×600 dpi in an edge region is the same in the printing modes A and B. In the following, how image data transitions in the processes in S501 to S511 in FIG. 5 will be discussed as an example.

Figure 10A:
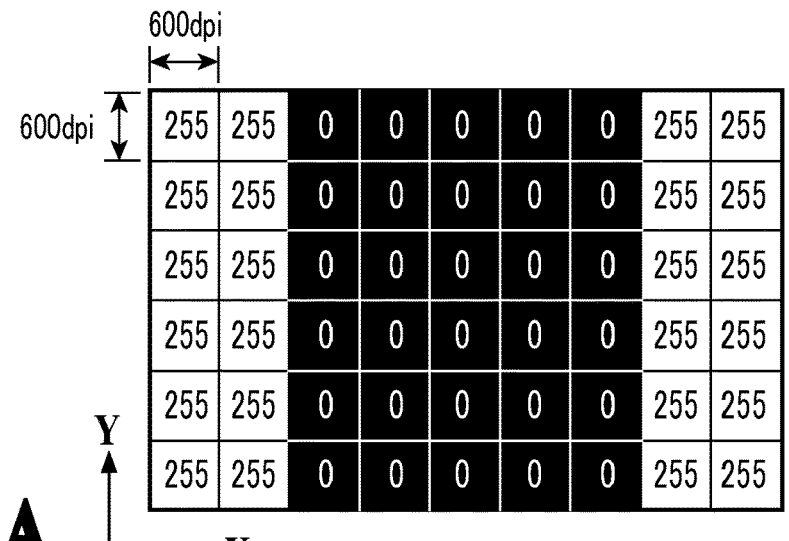
FIGS. 10A to 10F are schematic diagrams illustrating transitions of image data (printing mode A)
Figure 10B:
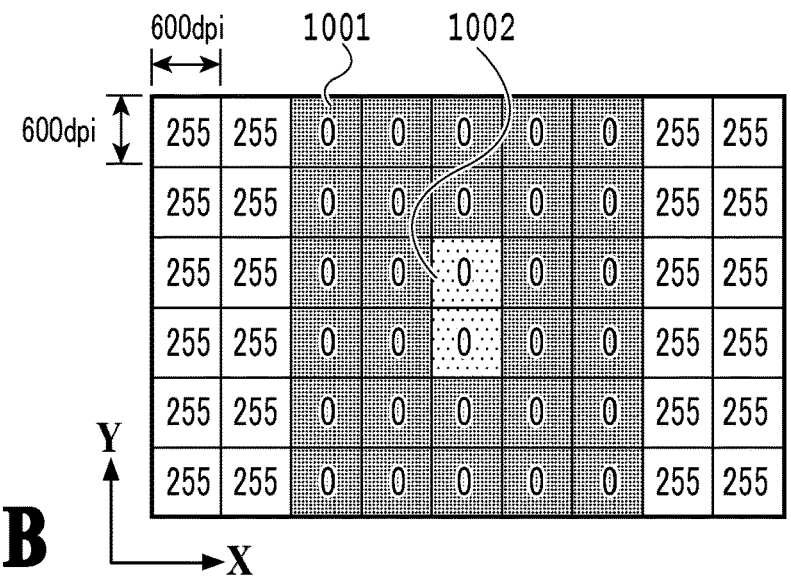
Figure 10C:
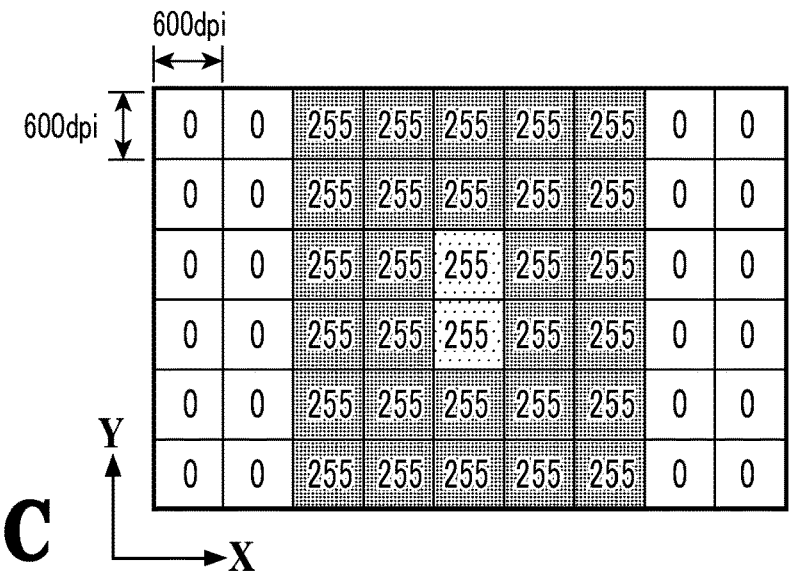

FIGS. 10A to 10F illustrate schematic diagrams of image data subjected to the processes in S501 to S511 in the printing mode A. The image illustrated in FIG. 10A, which is input in S501, is RGB data, and each single rectangle corresponds to a single pixel measuring 600 dpi×600 dpi on a print medium. 0 represents a pixel with R=G=B=0, i.e., black, and 255 represents a pixel with R=G=B=255, i.e., white. FIG. 10B illustrates this image data subjected to the edge detection process in S504. As illustrated in FIG. 10B, the image data includes an edge region 1001 depicted in gray and a non-edge region 1002. In FIG. 10B, the region in the black pixels covering a two-pixel range from the boundary with the white pixels (pixels covering 84 μm inward from the boundary) is detected as edge pixels. After S504, each pixel holding this information indicating whether it is an edge pixel or a non-edge pixel is subjected to the color correction process in S505 and the color separation process in S506. Here, FIG. 10C is a diagram illustrating the image data subjected to the color separation process in S506. The color separation process in S506 converts the RGB data into signal values of the ink colors C, M, Y, and K. Here, the values in FIG. 10C indicate tone values of K, and the illustration indicates that R=G=B=0 is converted into K=255 and R=G=B=255 is converted into K=0.

Figure 11A:
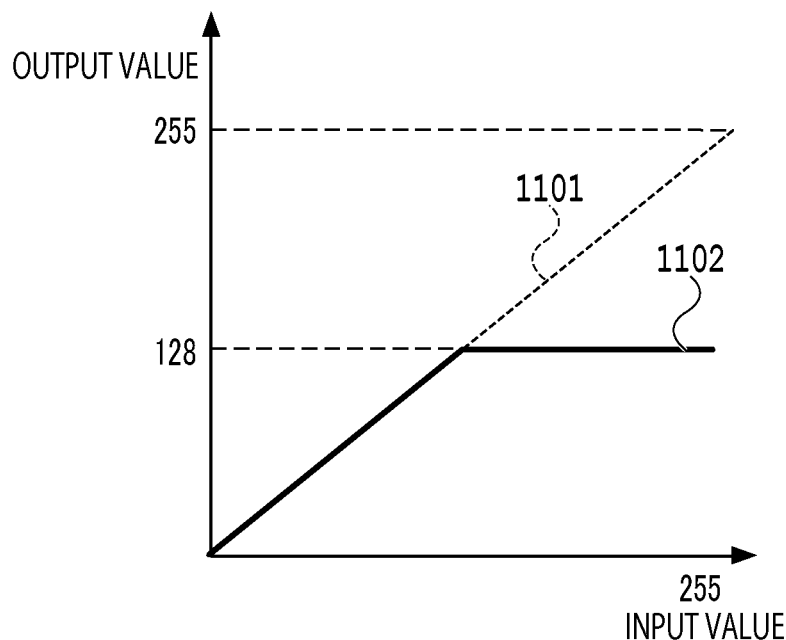
FIGS. 11A and 11B are schematic diagrams of one-dimensional look-up tables.

Next, the image data subjected to the color separation process in S506 is subjected to the tone correction processes in S508 and S509. Here, FIG. 11A illustrates an example of the 1D-LUTs used in the tone correction processes in S508 and S509 in the printing mode A. In the printing mode A, a 1D-LUT 1101 in FIG. 11A is used in a case of performing the first tone correction process on a non-edge pixel in S508, and a 1D-LUT 1102 is used in a case of performing the second tone correction process on an edge pixel in S509. In FIG. 11A, the horizontal axis represents the input tone value while the vertical axis represents the output tone value.

Figure 10D:
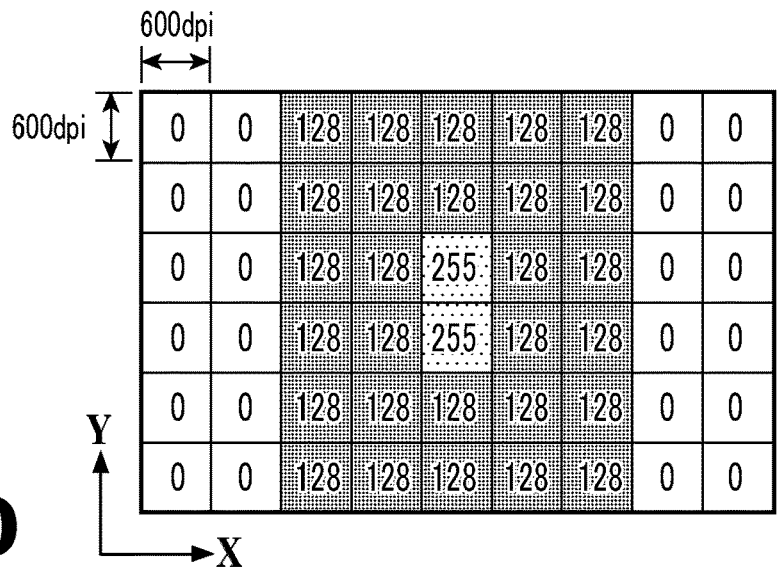

FIG. 10D illustrates the image data after being subjected to the tone correction processes in S508 and S509. According to the 1D-LUTs in FIG. 11A, since the input values (K signal values) of the non-edge pixels are 255, the output values are 255. On the other hand, the input values (K signal values) of the edge pixels are 255 but the output values are 128. Thus, in FIG. 10D, 255 is in the non-edge pixels of the printing unit and 128 is in the edge pixels. As described above, with the same input value, the output value of an edge pixel is made smaller than the output value of a non-edge pixel. In this way, the number of dots per unit region of 600 dpi×600 dpi in the edge region is made smaller than the number of dots per unit region of 600 dpi×600 dpi in the non-edge region. This reduces bleeding of the ink at the edge region.

Figure 10E:
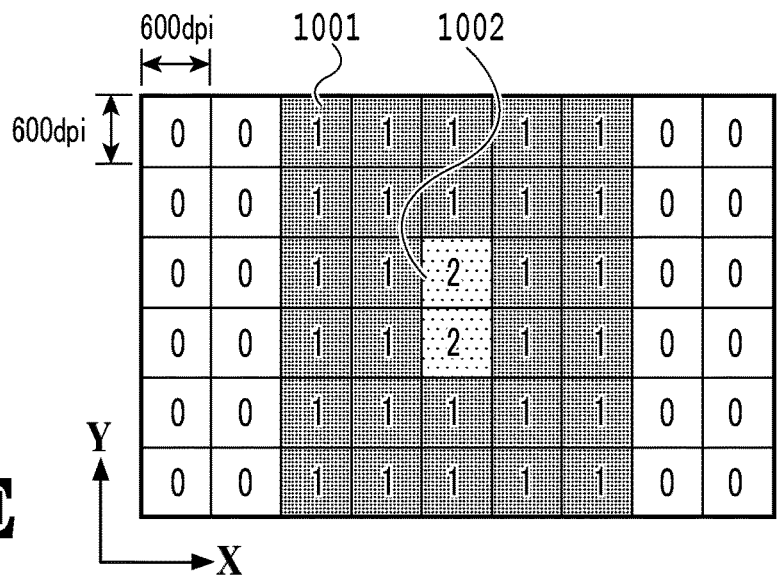

Next, the quantization process in S510 is performed based on the above output values of the tone correction processes in S508 and S509. FIG. 10E illustrates the image data subjected to the quantization process in S510. In the quantization process, the output tone values of the tone correction processes (0 to 255) are quantized based on three tones (levels 0 to 2). In the quantized data, level 0 represents a state where no ink droplet is ejected on a single pixel (600 dpi×600 dpi) region, level 1 represents a state where one ink droplet is ejected on the region, and level 2 represents a state where two ink droplets are ejected on the region. An output value of 128 obtained in the tone correction process is quantized into level 1 by the quantization process. In this way, quantized data as illustrated in FIG. 10E is obtained by the quantization process. In FIG. 10E as compared to FIG. 10A, level 0 is allocated to the white pixels in FIG. 10A, level 1 is allocated to the edge pixels among the black pixels, and level 2 is allocated to the non-edge pixels among the black pixels.

Figure 10F:
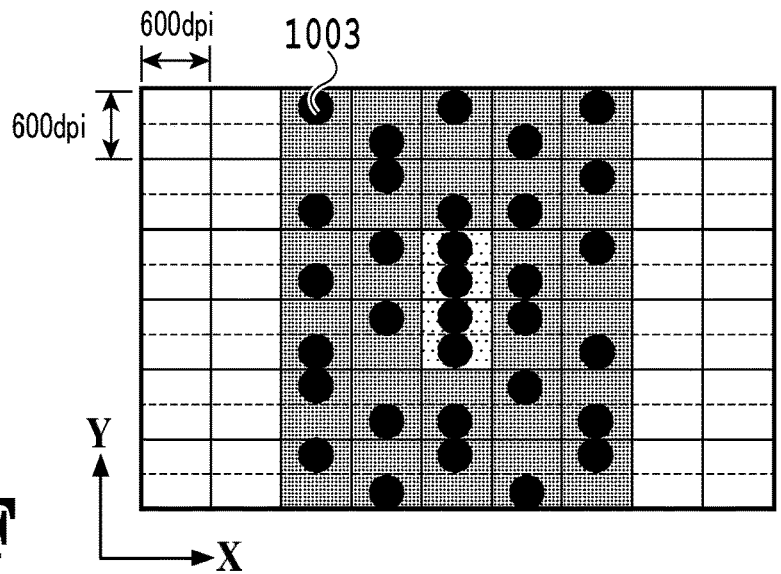

Next, index development is performed in S511 based on the output values of the quantization process. FIG. 10F illustrates the image subjected to the index development in S511. Each black circle 1003 in FIG. 10F represents a dot. In the index development process in S511, dots are distributed to nozzles according to the output values of the quantization process in S510 (the numbers of dots). Specifically, from among multiple dot arrangement patterns each designating the number of dots to be printed in each individual pixel and the position of the dot(s), one dot arrangement pattern is selected in association with the level obtained in the quantization process in S510. Using an index pattern designating these positions, binary data is generated in which whether to eject or not to eject the ink is specified for each pixel. In the present embodiment, the number of dots per pixel is one in a case where the quantization process output value is "1", and two in a case where the quantization process output value is "2". In the present embodiment, one pixel corresponds to two nozzles in the sub scanning direction Y. Thus, a pattern in which a dot is arranged in an even-numbered nozzle or an odd-numbered nozzle is selected as the dot arrangement pattern for a quantization process output value of "1". On the other hand, for a quantization process output value of "2", the pattern in which a dot is arranged in both an even-numbered nozzle and an odd-numbered nozzle is selected, and a piece of image data is allocated to each of the nozzles. FIG. 10F illustrates a dot arrangement in which the number of dots per unit region of 600 dpi×600 dpi in the edge region in the printing mode A is one, as the result of the processes described above.

Figure 12A:
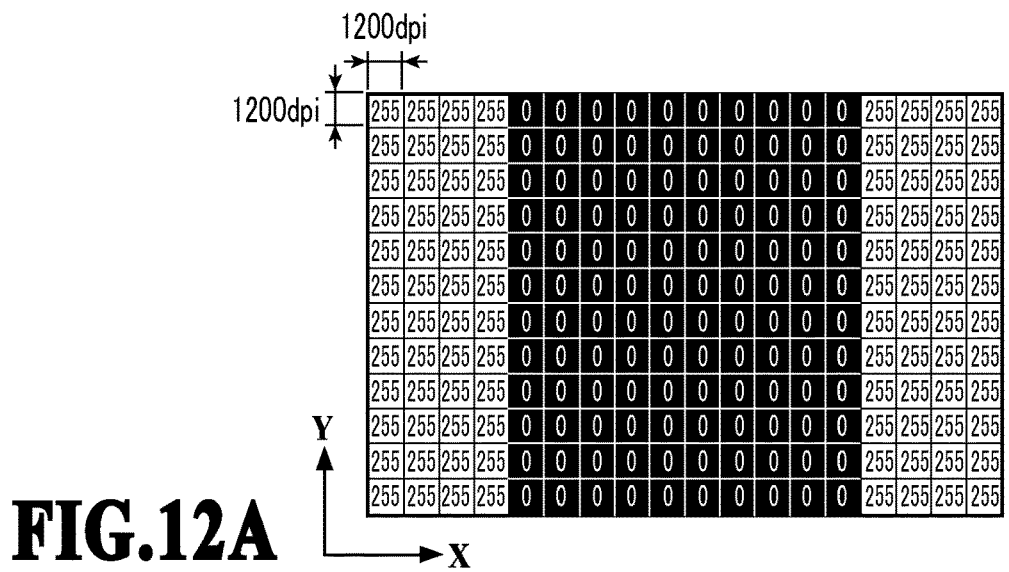
FIGS. 12A to 12F are schematic diagrams illustrating transitions of image data (printing mode B)
Figure 12B:
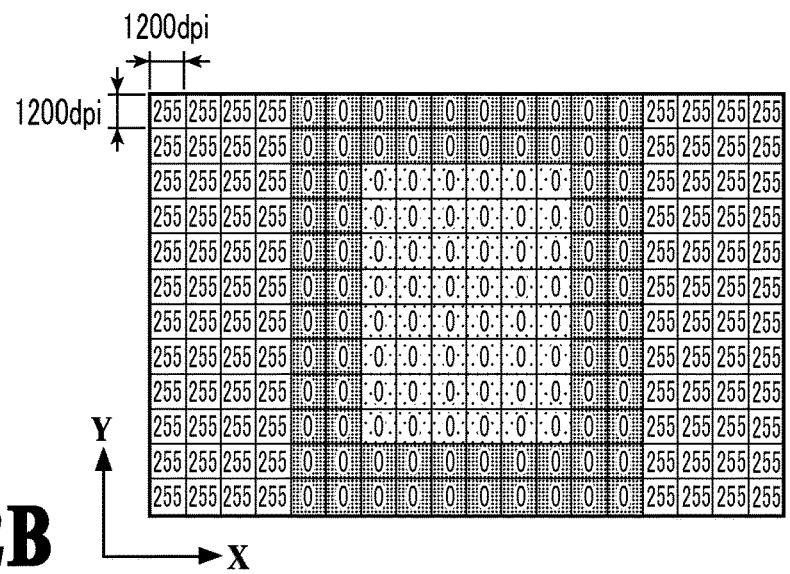

Next, FIGS. 12A to 12F illustrate schematic diagrams of the image region subjected to the processes in S501 to S511 in the printing mode B. Like FIG. 10A, the image illustrated in FIG. 12A, which is input in S501, is RGB data, and each single rectangle forming the image region corresponds to a single pixel measuring 1200 dpi×1200 dpi on a print medium. FIG. 12B illustrates image data obtained by performing the edge detection process on this image region in S504. As illustrated in FIG. 12B, the image region includes an edge region 1201 depicted in gray and a non-edge region 1202. In FIG. 12B, the region in the black pixels covering a two-pixel range from the boundary with the white pixels (a region covering 42 μm inward from the edge) is detected as an edge region.

Figure 12C:
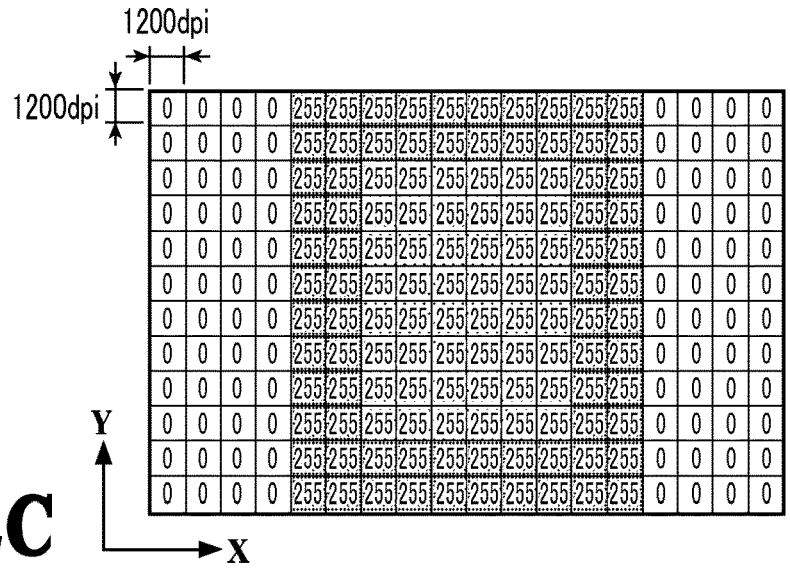

After S504, each pixel holding this information indicating whether it is an edge pixel or a non-edge pixel is subjected to the color correction process in S505 and the color separation process in S506. FIG. 12C illustrates the image region subjected to the color separation process in S506.

Figure 11B:
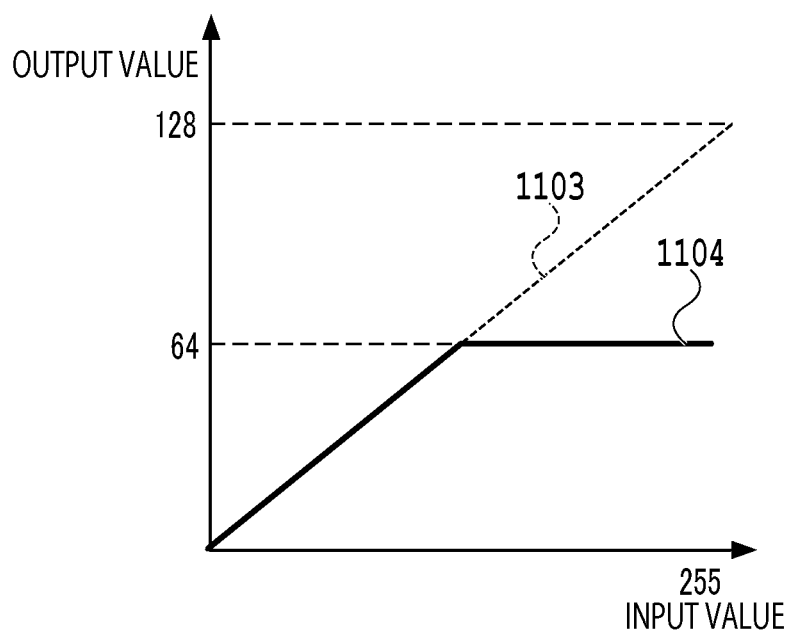

Next, the image data subjected to the color separation process in S506 is subjected to the tone correction processes in S508 and S509. Here, FIG. 11B illustrates an example of the 1D-LUTs used in the tone correction processes in S508 and S509 in the printing mode B. In the printing mode B, a 1D-LUT 1103 in FIG. 11B is used in a case of performing the first tone correction process on a non-edge pixel in S508, and a 1D-LUT 1104 is used in a case of performing the second tone correction process on an edge pixel in S509. In FIG. 11B, the horizontal axis represents the input tone value while the vertical axis represents the output tone value. Assume that the number of dots per unit region of 600 dpi×600 dpi in the edge region is set to be equal to FIG. 11A.

Figure 12D:
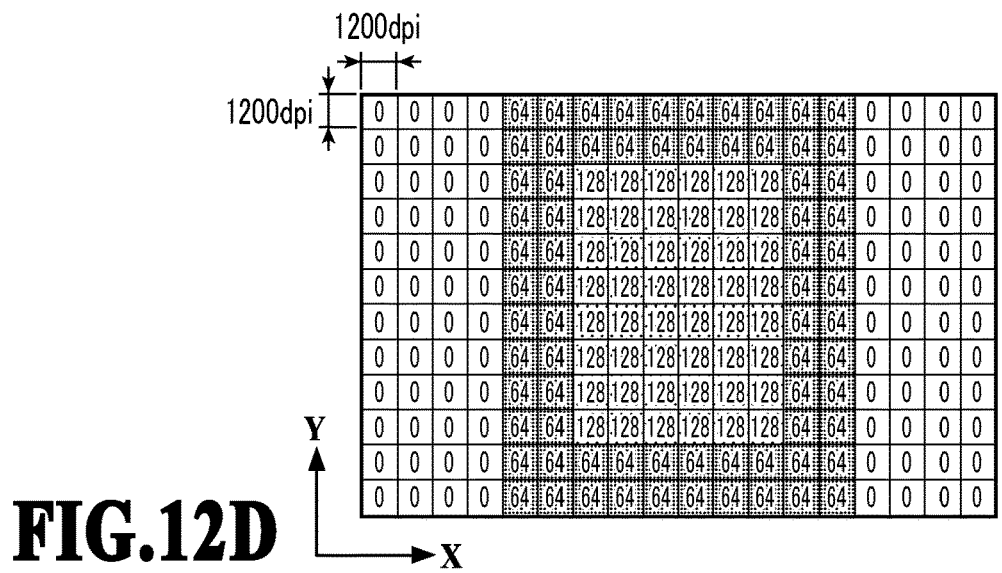

FIG. 12D illustrates the image data after being subjected to the tone correction processes in S508 and S509 based on the LUTs in FIG. 11B. According to the 1D-LUTs in FIG. 11B, in a case where the input values (K signal values) of the non-edge pixels are 255, the output values are 128. On the other hand, in a case where the input values (K signal values) of the edge pixels are 255, the output values are 64. Thus, in FIG. 10D, 128 is in the non-edge pixels among the black pixels and 64 is in the edge pixels.

Now, consider a case of making the numbers of dots per unit region of 600 dpi×600 dpi in edge regions and non-edge regions equal to those in the printing mode A. In this case, in non-edge regions, 0.5 dot is given per unit region of 1200 dpi×1200 dpi (2 dots per unit region of 600 dpi×600 dpi). On the other hand, in edge regions, 0.25 dot is given per unit region of 1200 dpi×1200 dpi (1 dot per unit region of 600 dpi×600 dpi). In the printing mode B in the present embodiment, a tone correction process output value of 255 corresponds to 1 dot in a single 1200-dpi pixel, a tone correction output value of 128 corresponds to 0.5 dot in a single 1200-dpi pixel, and a tone correction output value of 64 corresponds to 0.25 dot in a single 1200-dpi pixel. According to FIG. 11B, since the input values (K signal values) of the non-edge pixels are 255, the output values obtained in the tone correction are 128. The input values of the edge pixels are 255 but the output values obtained in the tone correction are 64. As described above, in the printing mode B, which uses a resolution twice higher than that in the printing mode A, the output tone values of the tone correction processes are set to be approximately half of the values in the printing mode A. In this way, the number of dots to be printed per unit region for the same input signal matches that in the printing mode A.

Figure 12E:
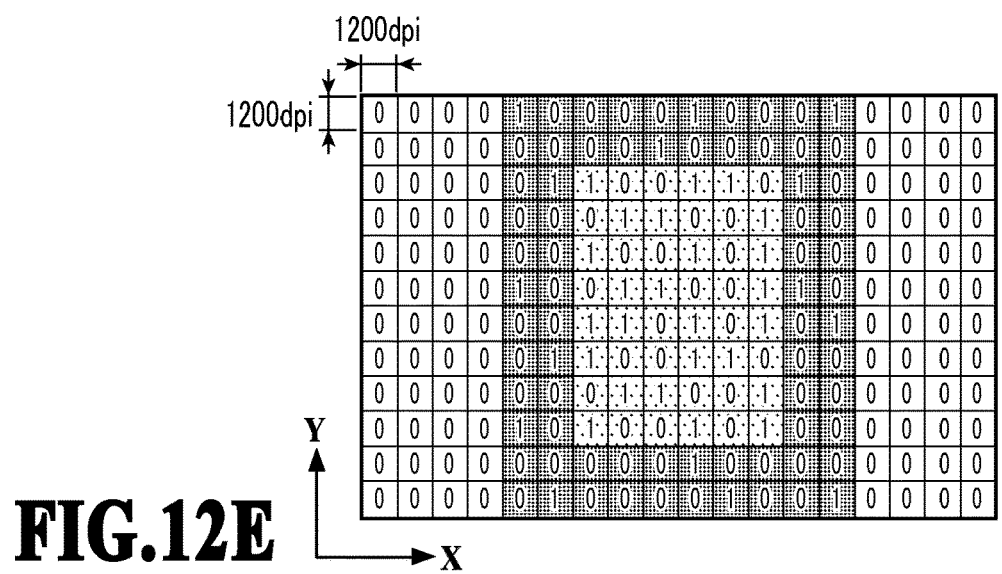

Next, the quantization process in S510 is performed based on the above output values of the tone correction processes in S508 and S509. FIG. 12E illustrates the image data subjected to the quantization process in S508. In the quantization process in the printing mode B, the image data in FIG. 12D is binarized using a dither matrix. FIG. 13 illustrates an example of the dither matrix. Each threshold value in the dither matrix and the corresponding output tone value in the image data are compared, and a quantized output value of "1" is given in a case where the output tone value in the image data is more than or equal to the threshold value. A quantized output value of "0" is given in a case where the output tone value is less than the threshold value. In the printing mode B, by the quantization process in S510, whether to print a dot (1) or not to print a dot (0) is determined for each print pixel having a resolution of 1200 dpi×1200 dpi. The index development process in S511 is skipped in the printing mode B.

Figure 12F:
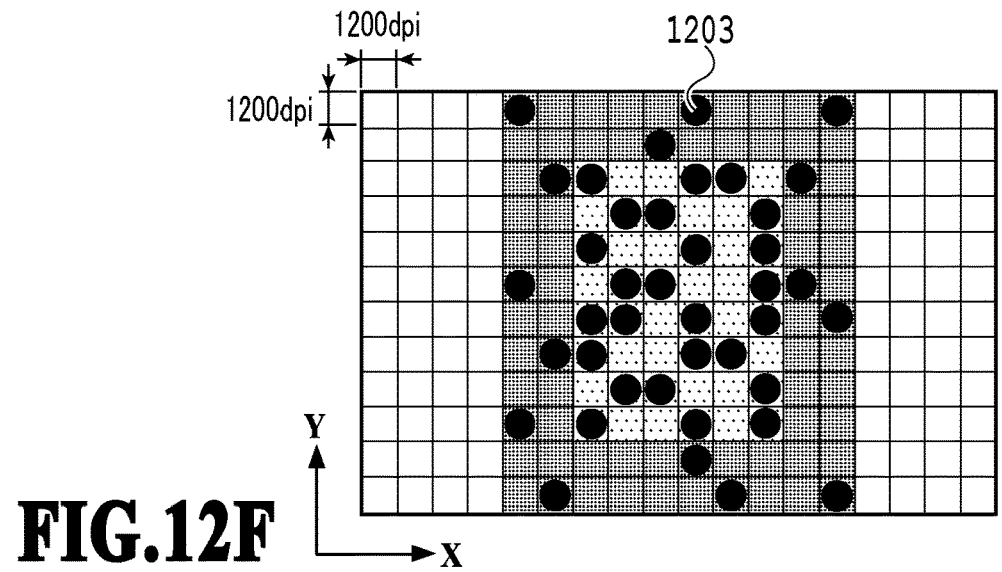

FIG. 12F illustrates the image subjected to the quantization process in S510 in the printing mode B. Each black circle 1203 in FIG. 12F represents a dot. According to FIG. 12F, no dot will be printed in the white pixels in FIG. 12A. As for the edge pixels among the black pixels, one dot will be printed in one pixel in a set of four pixels each measuring 1200 dpi×1200 dpi. As for the non-edge pixels among the black pixels, one dot will be printed in each of two pixels in a set of four pixels.

A case where input images differing in the distance across a single pixel in the sub scanning direction Y on a print medium are processed with the same edge detection filter and the same threshold values has been described above using FIGS. 10A to 10F and FIGS. 12A to 12F. In this case, as illustrated in FIGS. 10F and 12F, performing the tone correction processes so as to provide the same number of dots per unit region of 600 dpi×600 dpi in edge regions makes each detected edge region differ in area and dot arrangement.

Figure 14:
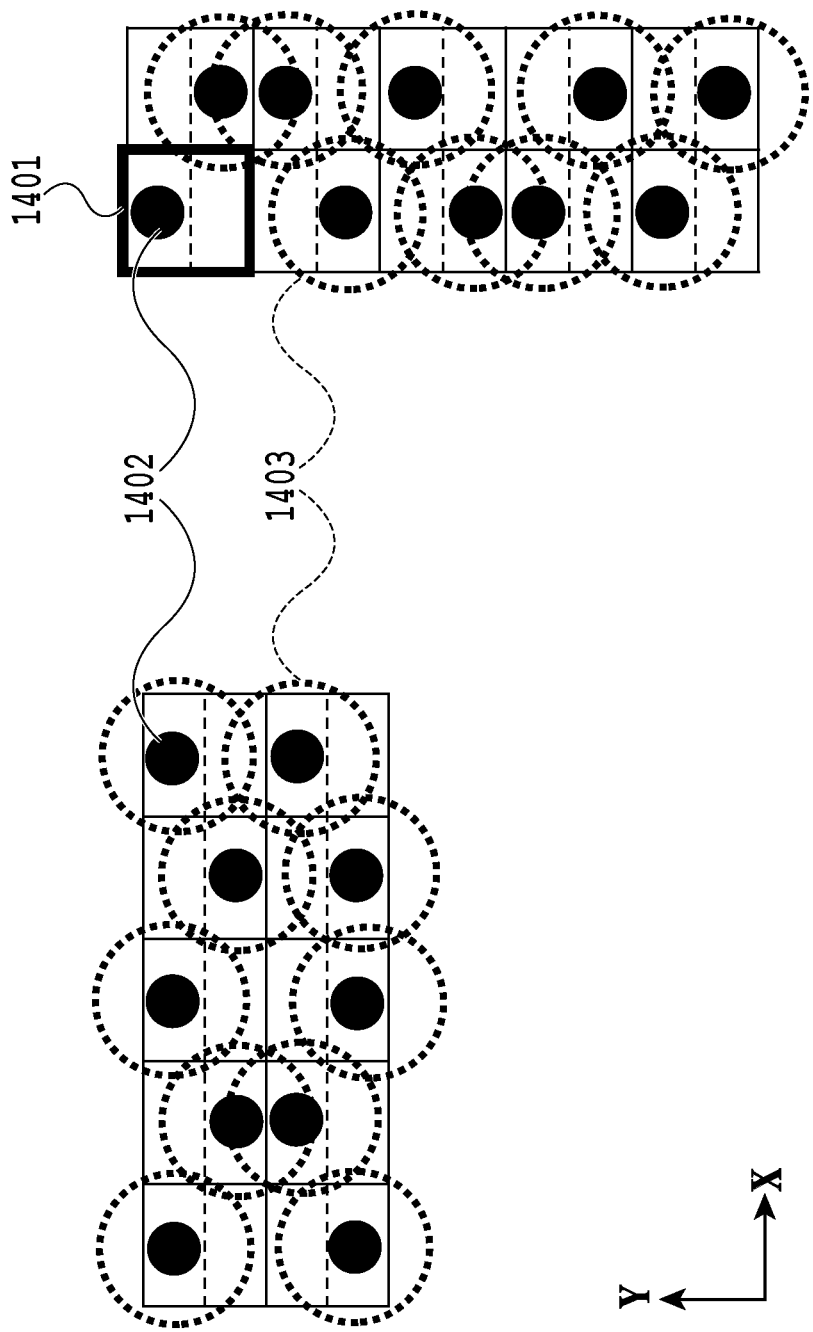
FIG. 14 is a diagram illustrating dot arrangements in an edge region in a case where a single pixel measures 600 dpi×600 dpi on a print medium.

Now, the number of dots in an edge region in the printing mode A and that in the printing mode B are compared. FIG. 14 illustrates a schematic diagram of parts of the edge region cut out of the dot arrangement in the printing mode A illustrated in FIG. 10F. Sign 1401 denotes a single pixel region with the input resolution (600 dpi×600 dpi), sign 1402 denotes dots, and sign 1403 denotes the diameters of dots after the ink droplets have spread on the print medium. The diameter of each dot denoted by sign 1403 is illustrated to be substantially equal to two nozzle pitches (the width of a single 600-dpi pixel region), which is 42 μm, and overlaps with others.

Figure 15:
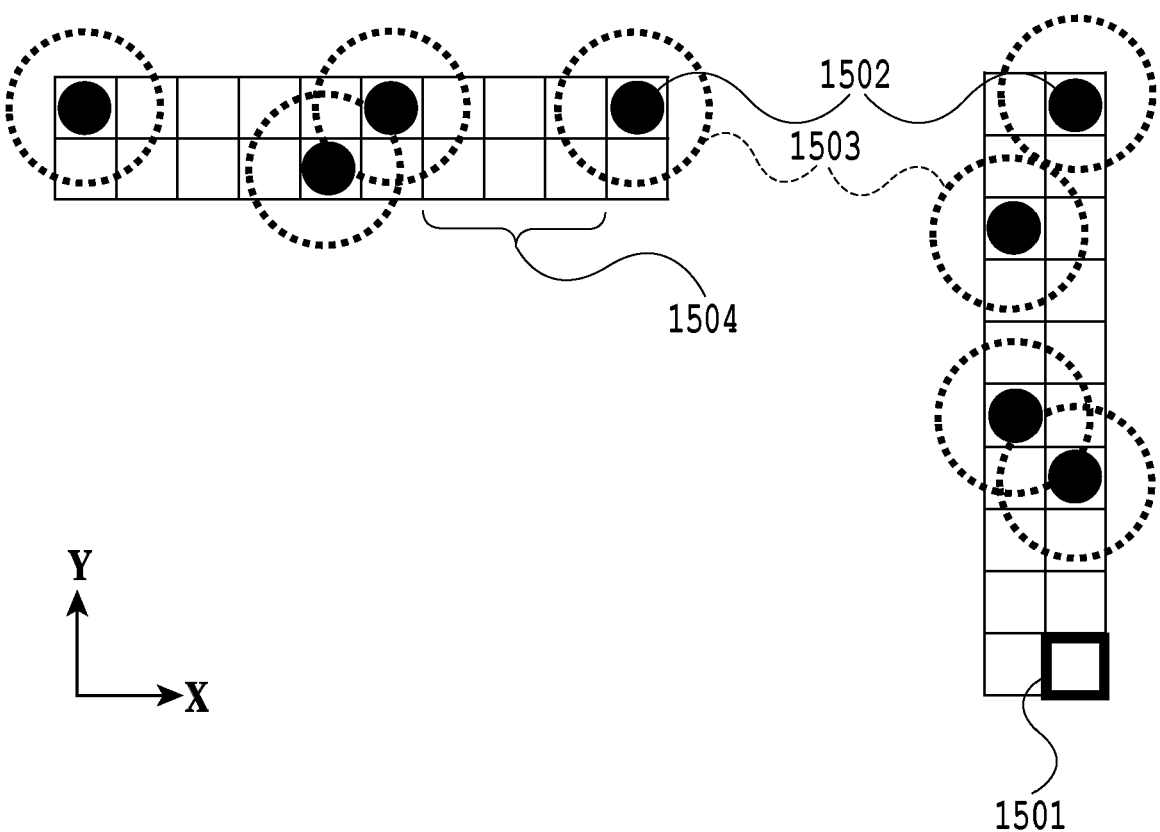
FIG. 15 is a diagram illustrating dot arrangements in an edge region in a case where a single pixel measures 1200 dpi×1200 dpi on a print medium.

FIG. 15, on the other hand, illustrates a schematic diagram of parts of the edge region cut out of the dot arrangement in the printing mode B illustrated in FIG. 12F. Sign 1501 denotes a single pixel region with the input resolution (1200 dpi×1200 dpi), sign 1502 denotes dots, and sign 1503 denotes the diameters of dots after the ink droplets have spread on the print medium. Comparing FIGS. 14 and 15, there is a distance 1504 in FIG. 15 by which dot diameters denoted by sign 1503 are separated.

Figure 16:
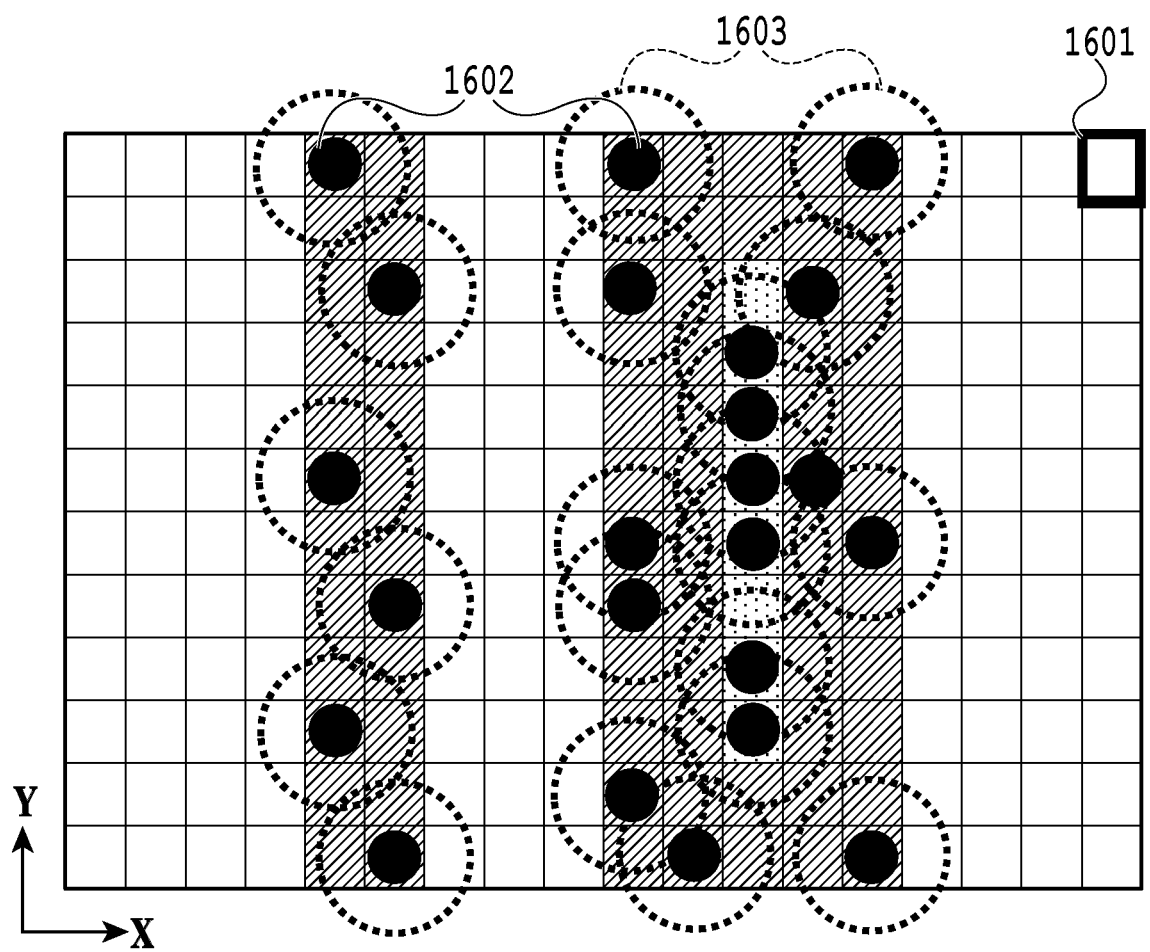
FIG. 16 is a diagram illustrating an image after performing image processing on each of a 2-pixel line and a 5-pixel line in the printing mode B.

FIG. 16 is a diagram illustrating an image after performing the processes in S501 to S511 on each of a line with the width of two pixels (left) and a line with the width of five pixels (right) in the printing mode B. Sign 1601 denotes a single pixel region with the input resolution (1200 dpi×1200 dpi), sign 1602 denotes dots, and sign 1603 denotes the diameters of dots having spread on the print medium. With a dot arrangement in which the diameters of dots do not overlap one another and are located to be separated as in FIG. 16, a line with all pixels being an edge region, such as a two-pixel line, appears as a discontinuous line, and a line including both an edge region and a non-edge region, such as a five-pixel line, is likely to be uneven.

Such line discontinuation and unevenness are visually recognized in a case where dots are separated by a predetermined distance or more in the extension direction of the ruling line. Specifically, a vertical ruling line appears discontinuous in a case where dots are separated in the sub scanning direction Y, and a horizontal ruling line appears discontinuous in a case where dots are separated in the main scanning direction X.

Figure 17:
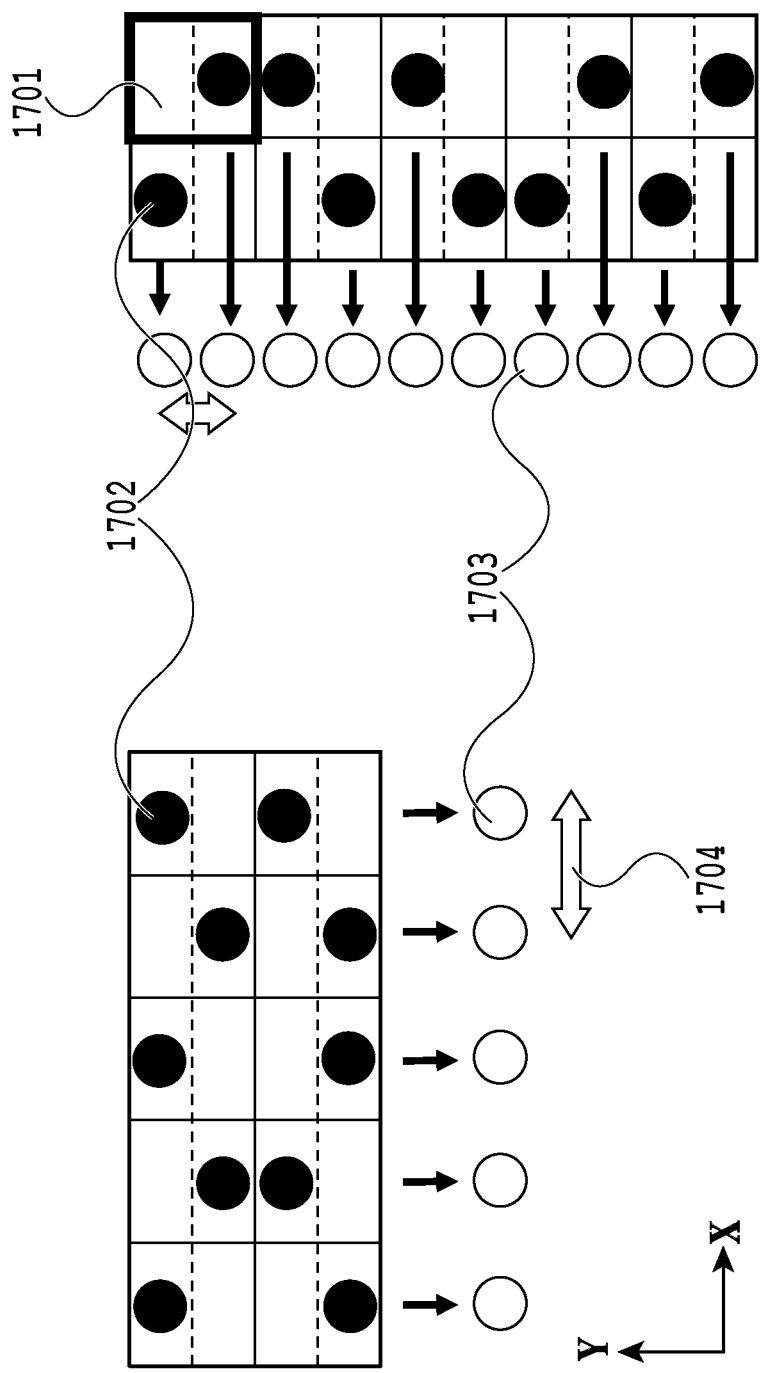
FIG. 17 is a schematic diagram obtained by projecting dots.
Figure 18:
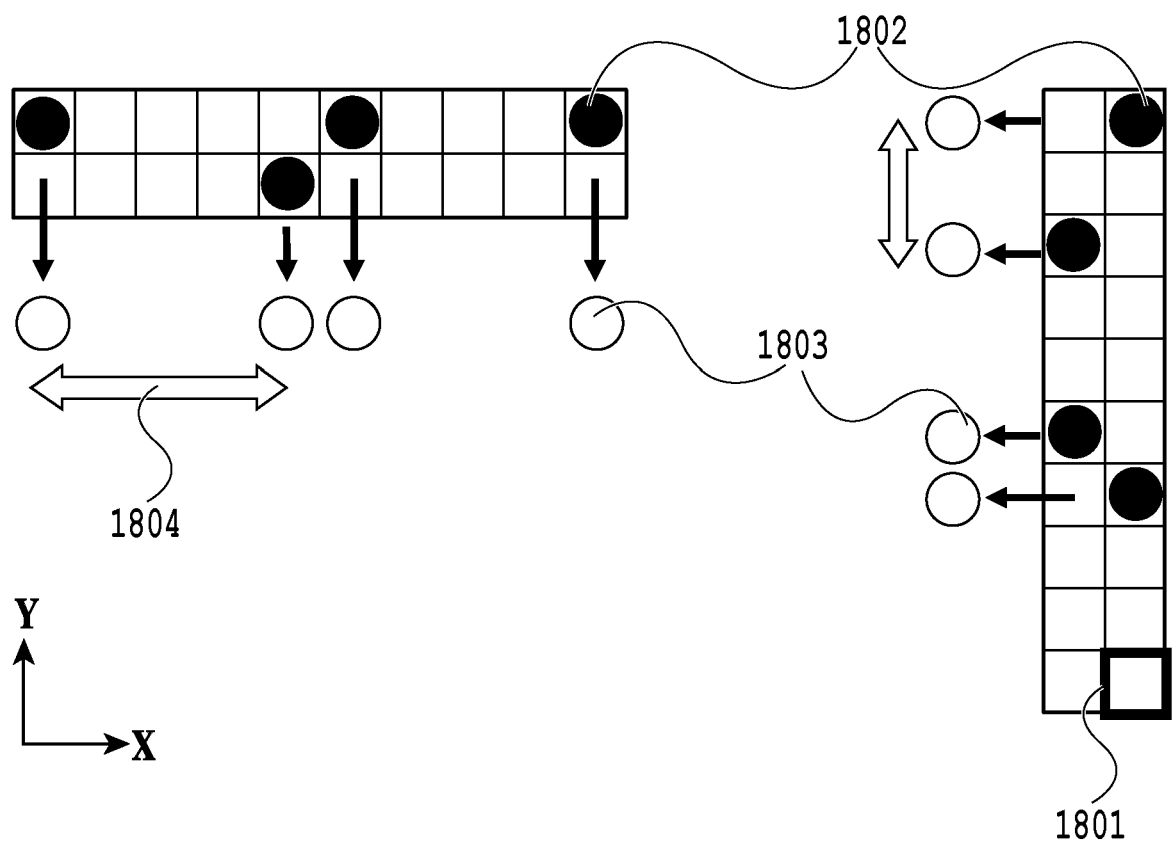
FIG. 18 is a schematic diagram obtained by projecting dots.

FIG. 17 is a schematic diagram obtained by projecting the dots in the dot arrangements illustrated in FIG. 14 from the extension direction and a direction perpendicular thereto. Sign 1701 denotes a single pixel region with the input resolution (600 dpi×600 dpi), sign 1702 denotes dots, and sign 1703 denotes dots projected from the extension direction of the ruling line and the direction perpendicular thereto. Also, FIG. 18 is a schematic diagram obtained by projecting the dots in the dot arrangements illustrated in FIG. 15 from the extension direction and a direction perpendicular thereto. Sign 1801 denotes a single pixel region with the input resolution (1200 dpi×1200 dpi), sign 1802 denotes dots, and sign 1803 denotes dots projected from the extension direction of the ruling line and the direction perpendicular thereto. Distances 1704 and 1804 between projected dots will be referred to as "adjacent dot distance". In a case where the adjacent dot distance in an edge region is larger than the dot diameter (42 μm) on the print medium, like a distance 1504 in FIG. 15, the line discontinuation or line unevenness appears at the edge region. With the nozzle pitch (1200 dpi) as N, the average value of the adjacent dot distances in an edge region was calculated with the dot arrangement in the printing mode A illustrated in FIG. 10F and also with the dot arrangement in the printing mode B illustrated in FIG. 12F. The average adjacent dot distance in the edge region in the printing mode A was 1.26N. The average adjacent dot distance in the edge region in the printing mode B was 2.6N. The average adjacent dot distance in the printing mode A, or 1.26N, is sufficiently smaller than the dot diameter (approximately 2N), so that the line does not appear discontinuous. On the other hand, the average adjacent dot distance in the printing mode B, or 2.6N, is larger than the dot diameter (approximately 2N), so that the line is likely to appear discontinuous.

In a case where the same edge process is performed on images with different input resolutions, the image with the higher input resolution is likely to have a longer average adjacent dot distance. Moreover, a line is likely to appear discontinuous in a case where the average adjacent dot distance is more than or equal to the dot diameter. Hence, the average adjacent dot distance in an edge region needs to be smaller than the dot diameter.

In view of the above, in the present embodiment, an image whose input resolution is more than or equal to the printing resolution is given a larger number of dots to be printed in an edge region than that of an image whose input resolution is less than the printing resolution. To do so, different edge processes are performed in the printing mode A, in which an image whose input resolution is less than the printing resolution is printed, and in the printing mode B, in which an image whose input resolution is more than or equal to the printing resolution is printed, by using 1D-LUTs.

Figure 19:
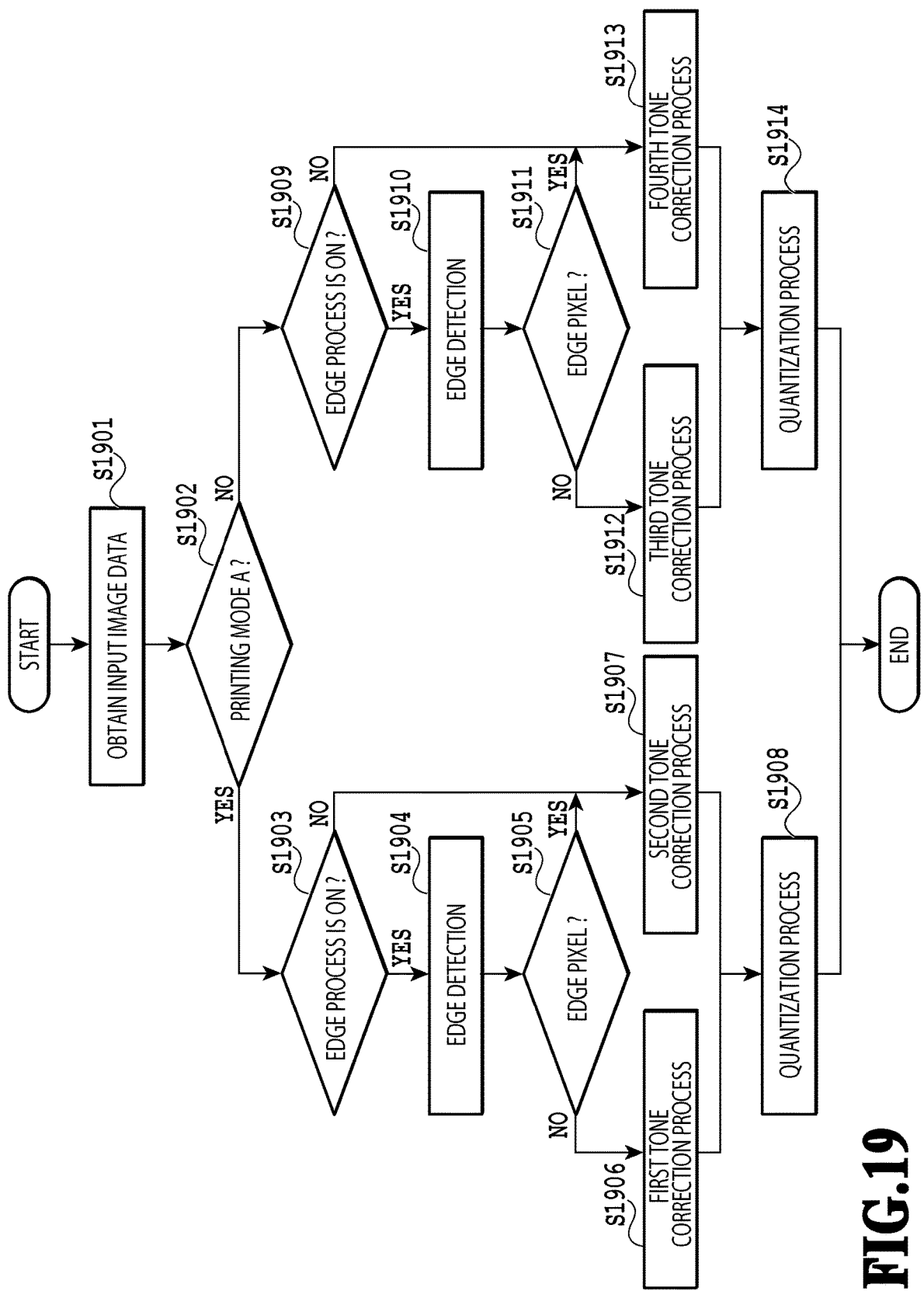
FIG. 19 is a flowchart of image processing in a first embodiment.

FIG. 19 is a flowchart of image processing in the present embodiment. S1903 to S1908 represent a process flow in the printing mode A, in which the input resolution is lower than the printing resolution, and S1909 to S1914 represent a process flow in the printing mode B, in which the input resolution is more than or equal to the printing resolution. Incidentally, the color correction process, the color separation process, and the index process are not illustrated in FIG. 19 since they are not important features of the present embodiment.

This processing is processing to be performed of the printer driver 404 in the functional block diagram of FIG. 4 and practically is processing to be executed by the main control unit 308 in FIG. 3. In S1901, the main control unit 308 obtains image data generated by the application 402. The image input in this step is an image synchronized with the printing resolution in the main scanning direction (X direction). Note that the image obtained in this step may be an image rendered at the printing resolution in the main scanning direction of the print head for the printing mode to be used and, in a case where an image input by the user has already been synchronized with the printing resolution in the main scanning direction, the input image may be used as is.

In the present embodiment, the printing resolution in the main scanning direction differs by the printing mode, and therefore the printing mode is determined in S1902. In S1902, the main control unit 308 determines whether the current printing mode of the printing apparatus 407 is the printing mode A. If the result of the determination in this step is positive, the main control unit 308 proceeds to S1903. If the result of the determination in this step is negative (that is, the current printing mode is the printing mode B), the main control unit 308 proceeds to S1909.

First, the case where the current printing mode is the printing mode A will be described. In S1903, the main control unit 308 determines whether to execute an edge process (whether a setting value of the edge process is on). The edge process refers to the edge detection process (S504) to the tone correction process (S508 or S509) described earlier. If the result of the determination in this step is positive, the main control unit 308 proceeds to S1904. If the result of the determination in this step is negative (that is, the setting value of the edge process is off), the main control unit 308 proceeds to S1907. Note that whether to execute the edge process may be determined based on the printing mode, or selectively set by the user in advance via a driver or the like.

In S1904, the main control unit 308 performs an edge detection process on the input image. The edge detection process is performed by performing the filtering process described with reference to FIGS. 6A to 6D and 7. As a result, each individual pixel is given 1-bit information indicating whether it is an edge pixel or a non-edge pixel.

In S1905, the main control unit 308 executes a process of determining whether the target pixel is an edge pixel or a non-edge pixel. The main control unit 308 executes the first tone correction process in S1906 if the target pixel is a non-edge pixel, and executes the second tone correction process in S1907 if the target pixel is an edge pixel. Note that the processes in S1905 to S1907 will be repeated for all pixels in the image subjected to the edge detection in S1904 while switching the target pixel to another.

In S1908, the main control unit 308 executes a quantization process for the printing mode A. Specifically, the main control unit 308 quantizes the output tone values of the tone correction processes to thereby obtain 3-level quantized values. Moreover, the main control unit 308 performs an index development process to thereby generate binary data corresponding to the printing resolution.

Next, the case with the printing mode B will be described. In S1909, the main control unit 308 determines whether to execute the edge process (whether the setting value of the edge process is on). If the result of the determination in this step is positive, the main control unit 308 proceeds to S1910. If the result of the determination in this step is negative (that is, the setting value of the edge process is off), the main control unit 308 proceeds to S1913.

In S1910, the main control unit 308 performs the edge detection process on the input image.

In S1911, the main control unit 308 executes the process of determining whether the target pixel is an edge pixel or a non-edge pixel. The main control unit 308 executes a third tone correction process in S1912 if the target pixel is a non-edge pixel, and executes a fourth tone correction process in S1913 if the target pixel is an edge pixel. Note that the processes in S1911 to S1913 will be repeated for all pixels in the image subjected to the edge detection in S1910 while switching the target pixel to another.

In S1914, the main control unit 308 executes a quantization process for the printing mode B. Specifically, the main control unit 308 quantizes the output tone values of the tone correction processes to thereby obtain binary quantized values corresponding to the printing resolution.

Figure 20A:
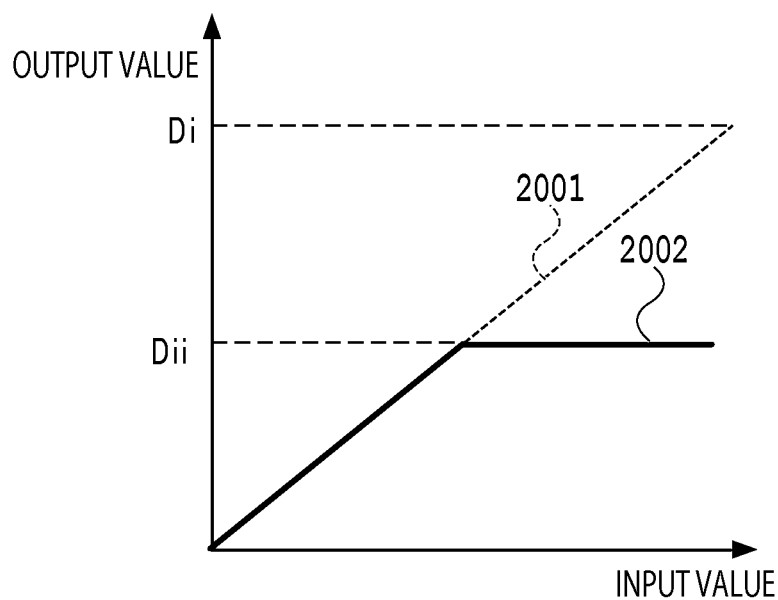
FIGS. 20A and 20B are schematic diagrams of one-dimensional look-up tables in the first embodiment.
Figure 20B:
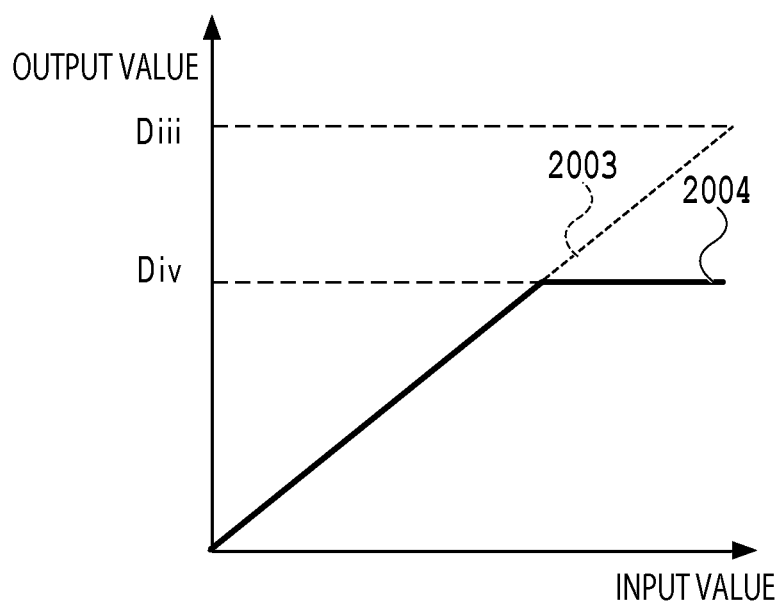

FIGS. 20A and 20B illustrate the 1D-LUTs used in the respective tone correction processes in FIG. 19 (S1906, S1907, S1912, and S1913). In the graphs illustrated in FIGS. 20A and 20B, the horizontal axis represents the input tone value of each of K, C, M, Y, etc. in the input image while the vertical axis represents an output tone value correlated to the number of dots to be applied onto a print medium.

FIGS. 20A and 20B are diagrams illustrating the 1D-LUTs used in the tone correction processes in the printing mode A and the printing mode B, respectively. As illustrated in FIG. 20A, a maximum output value $D_{ii}$ in a 1D-LUT 2002 for edge pixels in the printing mode A is smaller than a maximum output value $D_i$ in a 1D-LUT 2001 for non-edge pixels. Also, as illustrated in FIG. 20B, a maximum output value $D_{iv}$ in a 1D-LUT 2004 for edge pixels in the printing mode B is smaller than a maximum output value $D_{iii}$ in a 1D-LUT 2003 for non-edge pixels. The present embodiment is characterized in that the number of dots per unit area converted from the maximum output value $D_{iv}$ for edge pixels in the printing mode B is larger than the number of dots per unit area converted from the maximum output value $D_{ii}$ for edge pixels in the printing mode A. By making the number of dots per unit area in edge regions in the printing mode B larger than that in the printing mode A, the number of dots in edge regions is increased, thereby shortening the average adjacent dot distance.

Next, the transitions of image data by the image processing in the printing mode A and the image processing in the printing mode B and the respective final dot arrangements in the present embodiment will be described in detail.

The transitions of image data in the case of performing the processes in S1901 to S1908 in the printing mode A are the same as FIGS. 10A to 10F mentioned earlier. That is, FIG. 10A illustrates the input image data obtained in S1901. FIG. 10B illustrates the image data subjected to the edge detection process in S1904. FIG. 10D illustrates the image data subjected to the tone correction processes in S1906 and S1907. FIG. 10E illustrates the image data subjected to the quantization process in S1908.

Figure 21A:
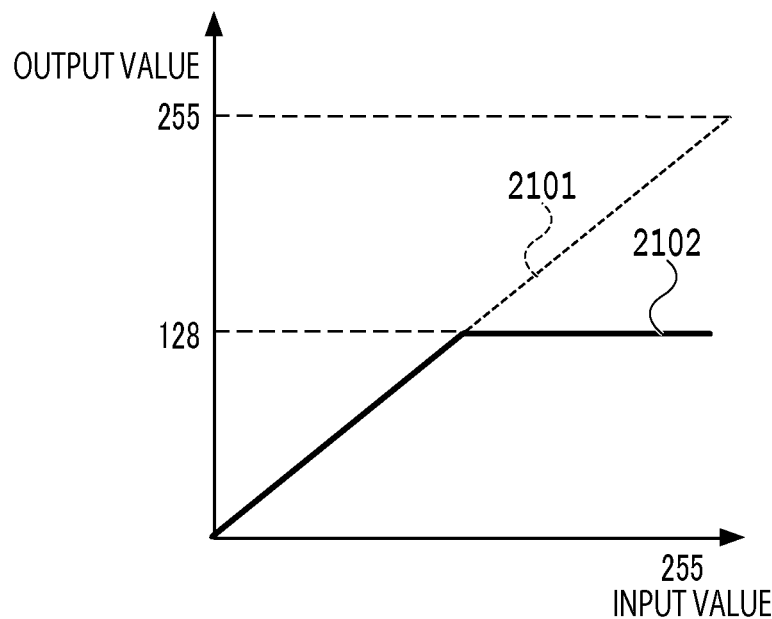
FIGS. 21A and 21B are schematic diagrams of one-dimensional look-up tables in the first embodiment.

Here, FIG. 21A illustrates an example of the 1D-LUTs used in the tone correction processes in S1906 and S1907. Like FIG. 11A, FIG. 21A is a diagram illustrating the 1D-LUTs used in the tone correction processes in S1906 and S1907. A 1D-LUT 2101 is used in the first tone correction process in S1906, and a 1D-LUT 2102 is used in the second tone correction process in S1907. In FIG. 10D, the value of 255 is the tone correction process output value $D_i$, and the value of 128 is the tone correction process output value $D_{ii}$. An output value of 255 means to eject two dots in a single 600-dpi pixel, and an output value of 128 means to eject one dot in a single 600-dpi pixel, as mentioned earlier.

Next, the transitions of image data in the case of performing the processes in S1901, S1902, and S1909 to S1914 in the printing mode B will be described. FIG. 12A illustrates the input image data obtained in S1901. FIG. 12B illustrates the image data subjected to the edge detection process in S1910.

Figure 21B:
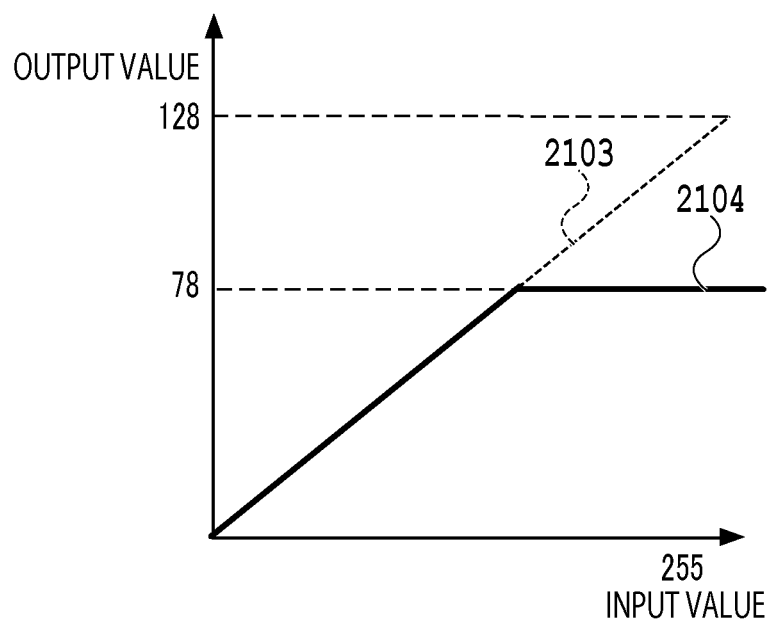
Figure 22A:
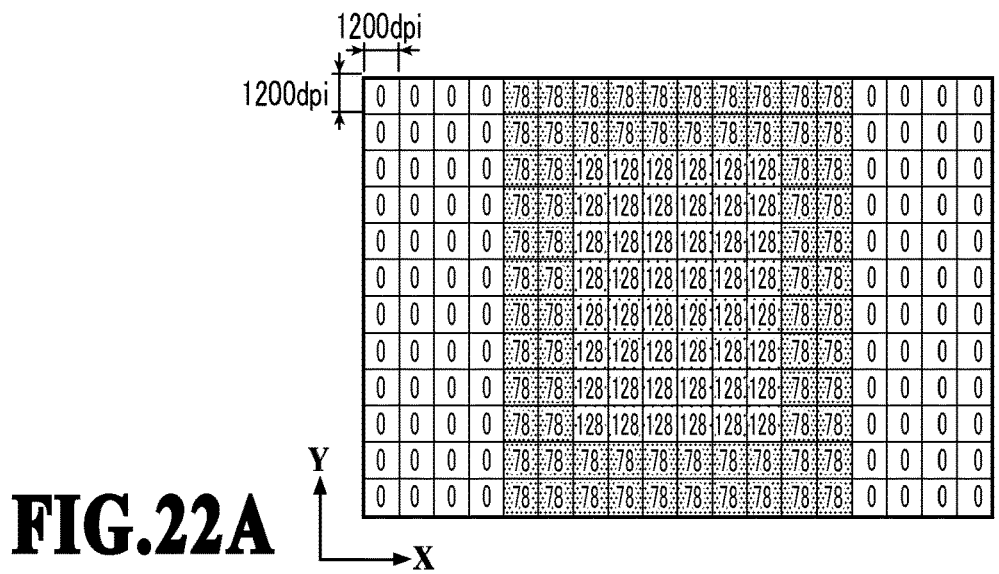
FIGS. 22A to 22C are schematic diagrams of image data in a case where a single pixel measures 1200 dpi×1200 dpi on a print medium in the first embodiment.

By the tone correction processes in S1912 and S1913, each signal value in the image data becomes such that the output value $D_{iii}$ is in each non-edge pixel of the printing unit and the output value $D_{iv}$ is in each edge pixel of the printing unit. Here, FIG. 21B illustrates an example of the 1D-LUTs used in the tone correction processes in S1912 and S1913. In FIG. 21B, the output value $D_{iii}$ is 128, and the output value $D_{iv}$ is 78. FIG. 22A illustrates the image data subjected to the tone correction processes in S1912 and S1913. In FIG. 22A, an output value of 128 represents 0.5 dot per unit region of 1200 dpi×1200 dpi (2 dots per unit region of 600 dpi×600 dpi). Also, an output value of 78 represents 0.3 dot per unit region of 1200 dpi×1200 dpi (1.2 dots per unit region of 600 dpi×600 dpi).

Note that the number of dots per unit region converted from the output value $D_{iv}$ only needs to be more than or equal to the number of dots per unit region converted from the output value $D_{ii}$, and is not limited to the above-mentioned value. In the printing mode B, which has a resolution twice higher than that in the printing mode A, $D_{iv}$ only needs to be set at a value above 64.

Figure 22B:
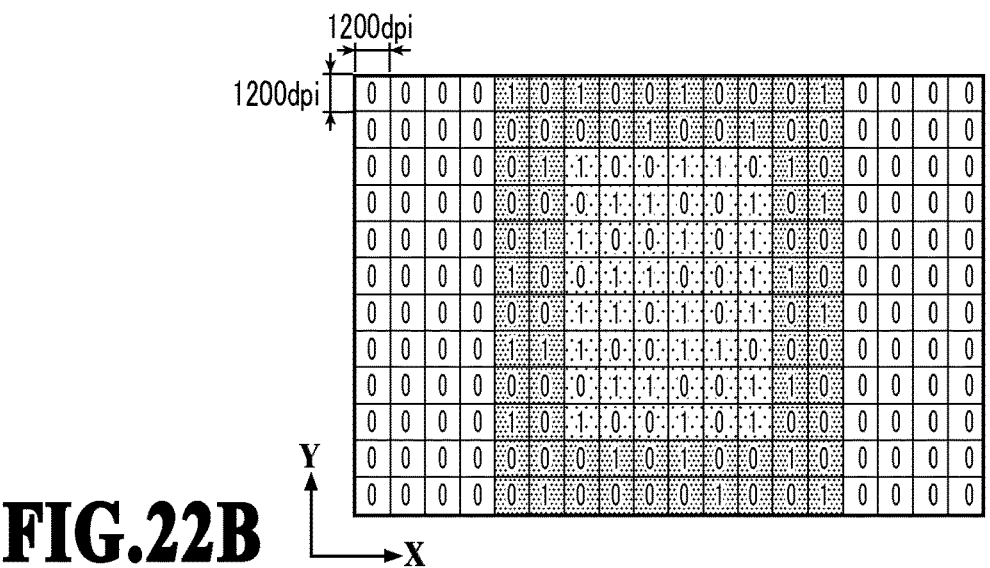
Figure 22C:
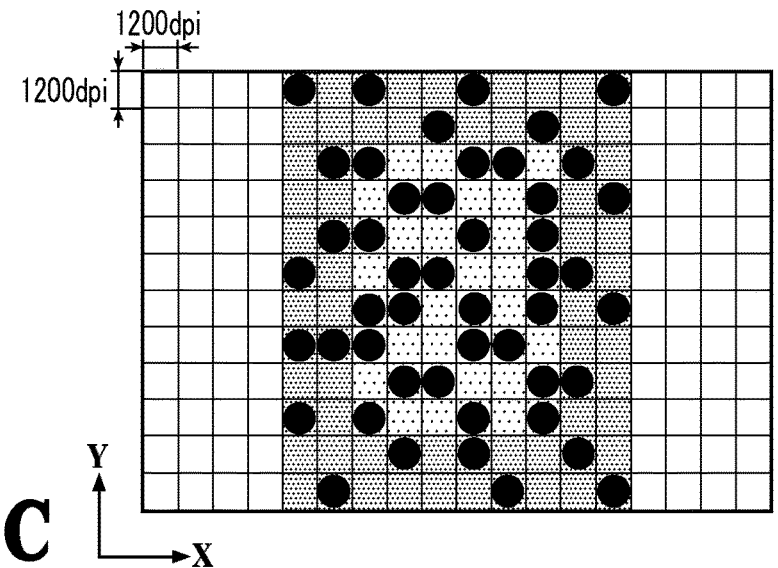

Next, in S1914, a quantization process is performed on the image data subjected to the tone correction processes. FIG. 22B illustrates the image data subjected to the quantization process in S1914 based on the results of the tone correction processes in S1912 and S1913. The quantization process is performed by performing a calculation using the dither matrix in FIG. 13 on the image data in FIG. 22A. In a case where the signal value of a pixel in the image data is more than or equal to the corresponding threshold value in the dither matrix, the quantized output value is "1". In a case where the signal value is less than the threshold value, the quantized output value is "0". FIG. 22C illustrates a pattern of dots arranged based on the result of the quantization process in FIG. 22B. It is a dot arrangement in which the number of dots per unit region of 1200 dpi×1200 dpi in the edge region is 0.3 (1.2 dot per unit region of 600 dpi×600 dpi). In FIG. 22C, the average adjacent dot distance in the edge region is 1.7 N. Since 1.7 N is a value smaller than the dot diameter (2 N), line discontinuation and unevenness are unlikely to appear.

Effect of Present Embodiment

As described above, in the present embodiment, an image whose input resolution is more than or equal to the printing resolution is given a larger number of dots per unit area in an edge region than that of an image whose input resolution is less than the printing resolution. In this way, line discontinuation and unevenness are unlikely to appear.

Second Embodiment

In the following, a method of printing edge pixels will be described. As described earlier, in edge regions, the ink density is low, so that adjacent dots are likely to be separated from one another. Also, in a case where dots are arranged randomly by dithering or the like, there will dots with different adjacent dot distances, and these may include dots with an adjacent dot distance greater than the dot diameter. In a second embodiment, in view of such a circumstance, dots in edge regions are arranged at equal intervals in the printing mode A, in which the distance across a single pixel in an input image in the sub scanning direction on a print medium is greater than the nozzle pitch.

Figure 23:
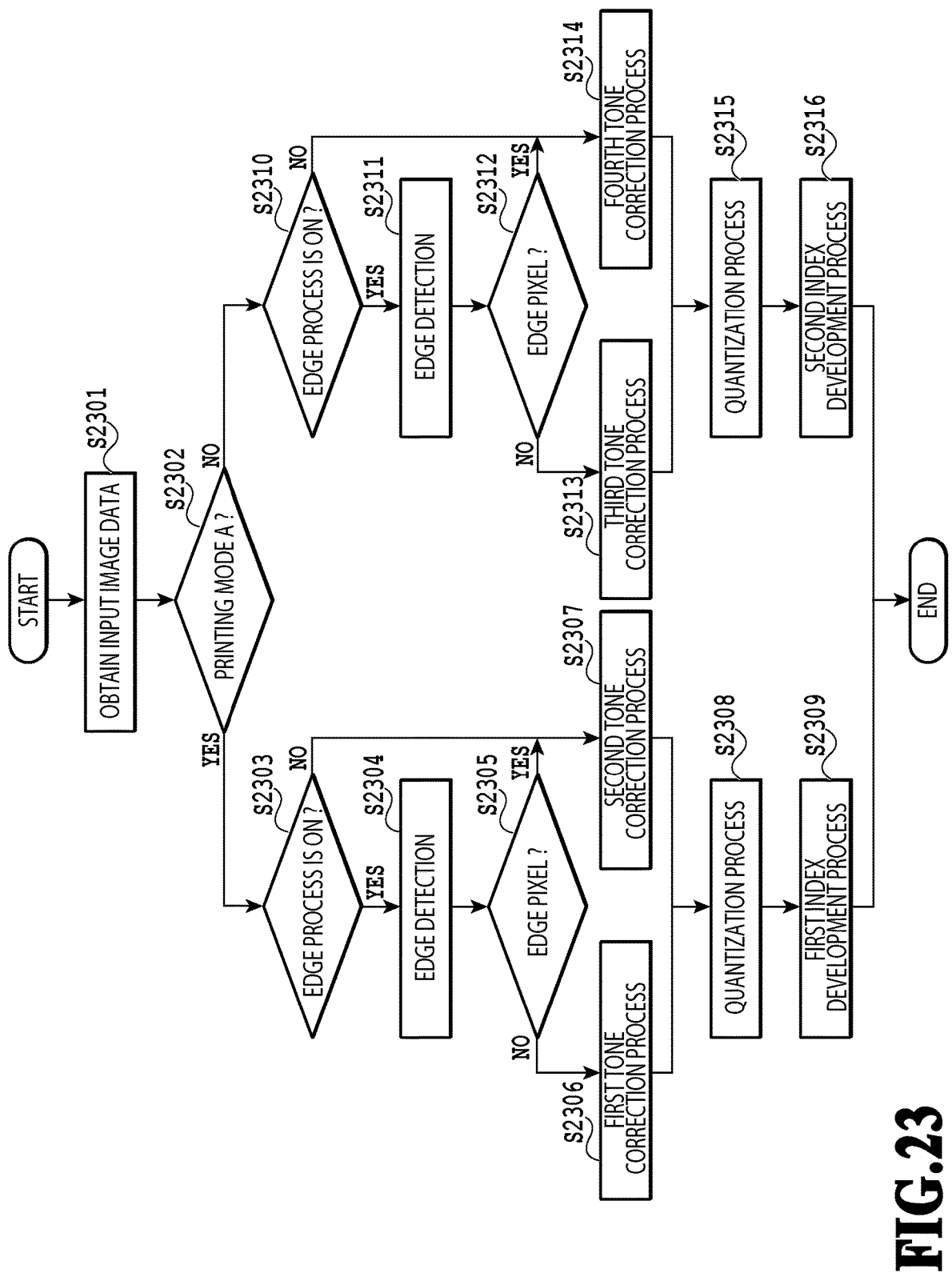
FIG. 23 is a flowchart of image processing in a second embodiment.

FIG. 23 is a flowchart of image processing in the present embodiment. The processes in S2301 to S2308 and S2310 to S2315 are similar to those in the first embodiment (see FIG. 19).

In the printing mode A, in S2309, a first index development process is performed on the image data subjected to the quantization process in S2308 (equivalent to the image data in FIG. 10E subjected to the quantization process in S1908). In the first index development process in S2309, from among multiple dot arrangement patterns each designating the number of dots to be printed in each individual pixel and the position of the dot(s), a dot arrangement pattern is selected according to the level obtained in the quantization process in S2308. In the index development process, such a dot arrangement pattern can be selected from between two dot arrangement patterns in each of which a dot is arranged in an even-numbered nozzle or an odd-numbered nozzle, in a case where the quantized output value is "1". Here, in the present embodiment, these two dot arrangement patterns are not disposed together in an edge region, and one of the dot arrangement patterns is selected.

Figure 24:
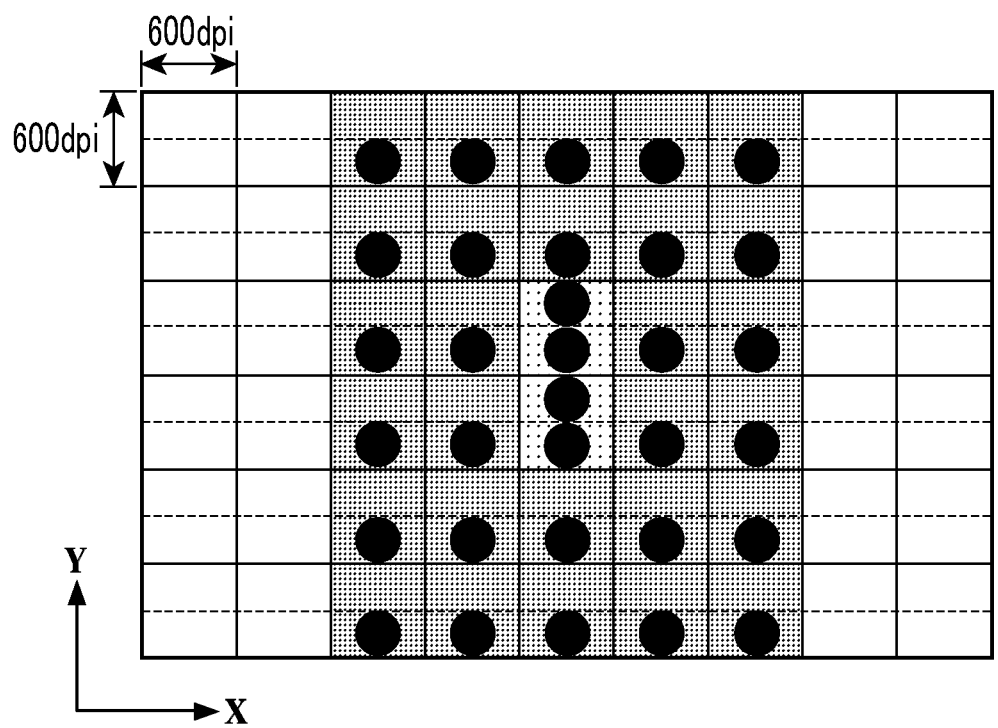
FIG. 24 is a schematic diagram of image data after an index development process in a case where a single pixel measures 600 dpi×600 dpi on a print medium in the second embodiment.

FIG. 24 illustrates image data subjected to index development using only a dot arrangement pattern with which only odd-numbered nozzles are used to print dots in an edge region. As illustrated in FIG. 24, the dots in the edge region are arranged at equal intervals owing to the index development process in S2309. In this way, the adjacent dot distance in the edge region is constantly 2N. In a case where the adjacent dot distance is less than or equal to the dot diameter as in FIG. 24, the line is unlikely to appear disconnected.

In the printing mode B, on the other hand, in S2316, the image data subjected to the quantization process in S2315 is dot data corresponding to the printing resolution. As in the first embodiment, the maximum output value $D_{iV}$ in the tone correction process for edge pixels is set at an appropriate value. Accordingly, line discontinuation and unevenness are prevented.

Effect of Present Embodiment

As described above, in the present embodiment, the number of dots per unit area in edge regions and the dot arrangement method are changed according to the printing mode. In this way, it is possible to provide a printed product without bleeding of images of lines, characters, or the like or line discontinuation and unevenness.

Other Embodiments

The printing modes as well as the signal values, the numbers of dots, and the dot diameter in the processes used in the description of the above embodiments are mere examples and are not intended to limit the present disclosure to the described printing modes, signal values, numbers of dots, and dot diameter.

Also, the above embodiments have been described using an inkjet printing apparatus, but the printing apparatus is not limited to the inkjet type. The concept of the present disclosure is applicable to printing apparatuses in general that are capable of applying a printing agent to a print medium, such as electrophotographic printing apparatuses. Moreover, the printing element in each nozzle is not limited to a thermal element that allows ejection by generating a bubble with a thermal energy, and a piezoelectric element may be used instead.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to avoid degradation of image quality in a case of performing an edge process on an input image in which the area of a single pixel on a print medium varies by the printing mode, and then printing the resulting image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-088824, filed May 31, 2022, which is hereby incorporated by reference wherein in its entirety.

What is claimed is:

1. A printing apparatus comprising:
    a print head in which a plurality of nozzles from which to eject a printing agent are arrayed along a first direction;
    a detection unit configured to detect an edge region and a non-edge region of an object in image data; and
    a tone correction unit configured to adjust an application amount of the printing agent for a unit region based on whether the unit region is the edge region or the non-edge region, wherein the printing apparatus is capable of performing printing in a first printing mode or a second printing mode, in the first printing mode, an input resolution of the image data is lower than a printing resolution of the print head, in the second printing mode, the input resolution of the image data is higher than or equal to the printing resolution of the print head, and the tone correction unit makes the application amount for the edge region in the second printing mode smaller than the application amount for the non-edge region and larger than the application amount for the edge region in the first printing mode.

2. The printing apparatus according to claim 1, further comprising:

an obtaining unit configured to obtain the image data; and a quantization unit configured to quantize an output value from the tone correction unit.

3. The printing apparatus according to claim 2, wherein the detection unit determines whether the unit region is the edge region or the non-edge region based on whether or not a calculated value obtained by a filtering process is more than or equal to a predetermined threshold value.

4. The printing apparatus according to claim 3, wherein the detection unit uses a same filter and a same threshold value in the first printing mode and the second printing mode.

5. The printing apparatus according to claim 2, wherein the quantization unit uses dithering.

6. The printing apparatus according to claim 5, wherein dots in the edge region in the first printing mode are printed at equal intervals.

7. The printing apparatus according to claim 6, wherein the edge region in the first printing mode is printed with an odd-numbered nozzle or an even-numbered nozzle.

8. A method of controlling a printing apparatus having a print head in which a plurality of nozzles from which to eject a printing agent are arrayed along a first direction, the method comprising:

detecting an edge region and a non-edge region of an object in image data; and adjusting an application amount of the printing agent for a unit region based on whether the unit region is the edge region or the non-edge region, wherein the printing apparatus is capable of performing printing in a first printing mode or a second printing mode, in the first printing mode, an input resolution of the image data is lower than a printing resolution of the print head, in the second printing mode, the input resolution of the image data is higher than or equal to the printing resolution of the print head, and the adjusting includes making the application amount for the edge region in the second printing mode smaller than the application amount for the non-edge region and larger than the application amount for the edge region in the first printing mode.

9. A non-transitory computer readable storage medium storing a program for causing a computer to execute a method of controlling a printing apparatus having a print head in which a plurality of nozzles from which to eject a printing agent are arrayed along a first direction, the method comprising:

detecting an edge region and a non-edge region of an object in image data; and adjusting an application amount of the printing agent for a unit region based on whether the unit region is the edge region or the non-edge region, wherein the printing apparatus is capable of performing printing in a first printing mode or a second printing mode, in the first printing mode, an input resolution of the image data is lower than a printing resolution of the print head, in the second printing mode, the input resolution of the image data is higher than or equal to the printing resolution of the print head, and the adjusting includes making the application amount for the edge region in the second printing mode smaller than the application amount for the non-edge region and larger than the application amount for the edge region in the first printing mode.

* * * * *